United States Patent
Kitahara et al.

(10) Patent No.: US 7,543,258 B2
(45) Date of Patent: Jun. 2, 2009

(54) CLOCK DESIGN APPARATUS AND CLOCK DESIGN METHOD

(75) Inventors: Takeshi Kitahara, Kawasaki (JP); Yoshiki Tsukiboshi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 235 days.

(21) Appl. No.: 11/402,525

(22) Filed: Apr. 11, 2006

(65) Prior Publication Data

US 2006/0253821 A1    Nov. 9, 2006

(30) Foreign Application Priority Data

Apr. 13, 2005   (JP)   ............ P2005-116208

(51) Int. Cl.
*G06F 17/50* (2006.01)
*G06F 9/45* (2006.01)

(52) U.S. Cl. ............ 716/6; 716/1; 716/5; 716/18

(58) Field of Classification Search ............ 716/1, 716/4–6, 18
See application file for complete search history.

(56) References Cited

U.S. PATENT DOCUMENTS

| | | | | |
|---|---|---|---|---|
| 5,336,940 | A * | 8/1994 | Sorrells et al. | 327/276 |
| 5,670,903 | A * | 9/1997 | Mizuno | 327/158 |
| 6,782,519 | B2 * | 8/2004 | Chang et al. | 716/6 |
| 6,907,585 | B2 * | 6/2005 | Kohno | 716/4 |
| 6,910,202 | B2 * | 6/2005 | Minami et al. | 716/18 |
| 7,096,442 | B2 * | 8/2006 | Lu et al. | 716/6 |
| 7,159,200 | B2 * | 1/2007 | Yoneda | 716/6 |
| 7,187,742 | B1 * | 3/2007 | Logue et al. | 375/376 |
| 2006/0061401 | A1 | 3/2006 | Shiratake et al. | |
| 2006/0114048 | A1 | 6/2006 | Shiratake | |

FOREIGN PATENT DOCUMENTS

JP       07-098617       4/1995

OTHER PUBLICATIONS

T. Fujiyoshi et al., "An H.264/MPEG-4 Audio/Visual Codec LSI with Module-Wise Dynamic Voltage/Frequency Scaling," International Solid-State Circuits Conference Digest of Technical Papers, 2005.

T. Kitahara et al., "Low-Power Design Methodology for Module-Wise Dynamic Voltage and Frequency Scaling with Dynamic De-Skewing Systems," Proceedings Asia and South Pacific Design Automation Conference, 2006.

* cited by examiner

*Primary Examiner*—Thuan Do
*Assistant Examiner*—Nghia M Doan
(74) *Attorney, Agent, or Firm*—DLA Piper LLP (US)

(57) ABSTRACT

A clock design apparatus includes a delay time adjusting section, a prohibition specifying section and a clock tree synthesis section. The delay time adjusting section is configured to adjust signal delay time of signal propagation paths on a semiconductor integrated circuit to be designed. The prohibition specifying section is configured to specify a part of the signal propagation paths as a circuit prevented from being changed. The clock tree synthesis section is configured to synthesize a clock tree of the semiconductor integrated circuit in accordance with the specification made by the prohibition specifying section.

19 Claims, 15 Drawing Sheets

CLOCK DESIGN APPARATUS AND CLOCK DESIGN METHOD

CROSS-REFERENCE TO RELATED APPLICATIONS

This application is based upon and claims the benefit of priority from the Japanese Patent Application No. 2005-116208 filed on Apr. 13, 2005; the entire contents of which are incorporated herein by reference.

BACKGROUND OF THE INVENTION

1. Field of the Invention

The invention relates to a clock wiring technology, and more particularly to a clock design apparatus and a clock design method for designing the clock wiring of a semiconductor integrated circuit in which its clock frequency and supply voltage are changed.

2. Description of the Related Art

A method for realizing the lower power consumption of a semiconductor integrated circuit by changing the clock frequency and the supply voltage of a logical block in the semiconductor integrated circuit according to the workload has been in practical use. This method is characterized by changing the clock frequency and the supply voltage of the logical block to be lower than those in a normal state, when workload processed by the logical block is light. Since the clock frequency and the supply voltage are changed to be lower, the above method is effective in reducing the power consumption of the logical block. Particularly, since the electric power consumed by charging and discharging an output load capacity is proportional to the square of the supply voltage, there is a great effect of reducing power consumption by changing the supply voltage to be lower. Further, a sub-threshold leakage current is reduced by changing the supply voltage to be lower. Therefore, there is also an effect in reducing the power consumption due to a leakage current.

It is effective to use a delay adjusting circuit in a low power consumption designing method for changing the supply voltage of the logical block. By using the delay adjusting circuit, a circuit in the logical block is operable even in a period during which the supply voltage value changes.

On the other hand, a semiconductor integrated circuit and its designing method for reducing the clock skew by referring to a delay value of the clock signal has been proposed (e.g., see JP Hei. 7-98617 A). However, the method disclosed in JP Hei. 7-98617 can cope with variations in the manufacture, but cannot reduce the clock skew in response to a delay of the clock signal caused by changing the supply voltage. That is, even if the method disclosed in JP Hei. 7-98617 A is applied to the clock design method for the semiconductor integrated circuit including the logical block in which its clock frequency and the supply voltage are changed according to the workload, the clock skew cannot be reduced.

SUMMARY OF THE INVENTION

According to an aspect of the invention, a clock design apparatus includes a delay time adjusting section, a prohibition specifying section and a clock tree synthesis section. The delay time adjusting section is configured to adjust signal delay time of signal propagation paths on a semiconductor integrated circuit to be designed. The prohibition specifying section is configured to specify a part of the signal propagation paths as a circuit prevented from being changed. The clock tree synthesis section is configured to synthesize a clock tree of the semiconductor integrated circuit in accordance with the specification made by the prohibition specifying section.

According to another aspect of the invention, an automatic clock design method for designing a clock wiring of a semiconductor integrated circuit includes: reading circuit information of the semiconductor circuit to be designed; adjusting signal delay times of signal propagation paths on the semiconductor integrated circuit; specifying a part of the signal propagation paths as a circuit prohibited from being changed; storing new circuit information of the semiconductor integrated circuit comprising the circuit prohibited from being changed; reading the new circuit information; and synthesizing a clock tree of the semiconductor integrated circuit based on the read new circuit information.

DETAILED DESCRIPTION OF EMBODIMENTS OF THE INVENTION

Figure 1:
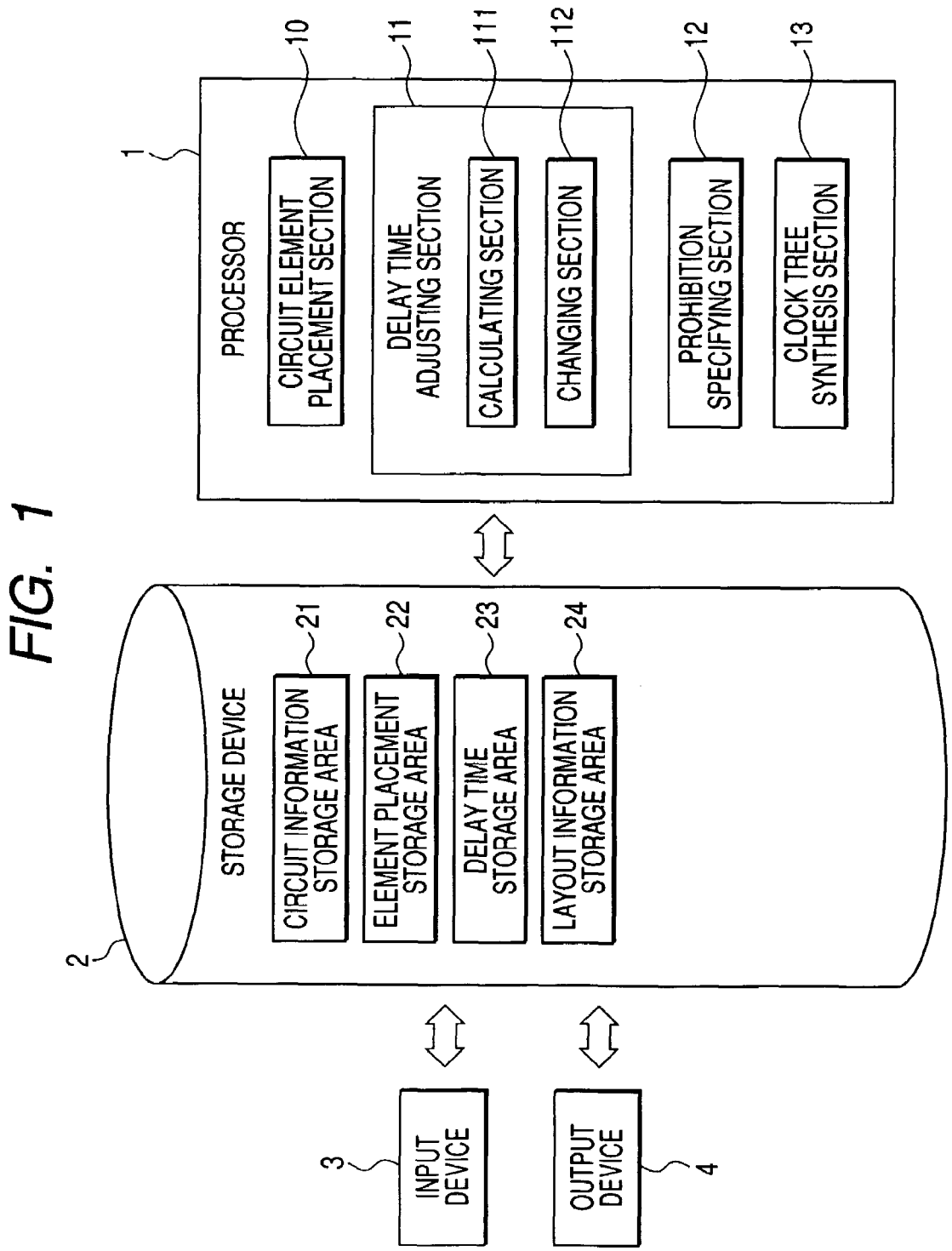
FIG. 1 is a schematic diagram showing the configuration of a clock design apparatus according to a first embodiment of the invention.

First and second embodiments of the invention will be described below with reference to the drawings. In the following description of the drawings, the same or like parts are denoted by the same or like reference numerals. Also, the first or second embodiment exemplifies an apparatus or method for embodying the technical concepts of the invention, but the technical concepts are not limited to the following structure and placement of components. The technical concepts of the invention may be modified in various ways within the scope of claims.

First Embodiment

A clock design apparatus according to a first embodiment of the invention includes a delay time adjusting section 11, a prohibition specifying section 12 and a clock tree synthesis section 13 as shown in FIG. 1. The delay time adjusting section 11 adjusts a signal delay time of a signal propagation path on a semiconductor integrated circuit to be designed. The prohibition specifying section 12 specifies a part of the signal propagation path as a circuit prohibited from being changed. The clock tree synthesis section 13 synthesizes a clock tree of the semiconductor integrated circuit in accordance with the specification made by the prohibition specifying section 12. The clock tree synthesis process is hereinafter referred to as a "CTS process".

The delay time adjusting section 11 includes a calculating section 111 and a changing section 112. The calculating section 111 calculates the signal delay time of the signal propagation path, based on circuit information of the semiconductor integrated circuit. The changing section 112 makes a circuit change, for example, inserts a buffer circuit into the signal propagation path. The changing section 112 cannot make a circuit change of a signal propagation path, which is specified by the prohibition specifying section 12 as a circuit prohibited from being change.

The delay time adjusting section 11, the prohibition specifying section 12 and the clock tree synthesis section 13 are contained in a processing device 1. Also, the processing device 1 further includes a circuit element placement section 10 that places circuit elements based on the circuit information of the semiconductor integrated circuit.

The clock design apparatus shown in FIG. 1 further includes a storage device 2, an input device 3 and an output device 4. The storage device 2 includes a circuit information storage area 21, an element placement storage area 22, a delay time storage area 23 and a layout information storage area 24. The circuit information of the semiconductor integrated circuit is stored in the circuit information storage area 21. The circuit information includes placement information of circuit elements placed on a chip area and information of network connecting the circuit elements. The placement information of the circuit elements placed by the circuit element placement section 10 is stored in the element placement storage area 22. The signal delay time calculated by the calculating section 111 is stored in the delay time storage area 23. The layout information of the semiconductor integrated circuit subjected to the CTS process is stored in the layout information storage area 24.

The input device 3 includes a keyboard, a mouse, a light pen, or a flexible disk unit. The input/output data is designated by the input device 3. Further, the format of output data may be designated by the input device 3, and an instruction of setting or stopping the clock design process may be input.

The output device 4 may be a display for displaying the placement result of clock wiring or a printer, or a recording device for saving the result in a computer readable recording medium. Herein, the "computer readable recording medium" means medium capable of recording electronic data such as an external memory device for computer, a semiconductor memory, a magnetic disk, an optical disk, an optical magnetic disk, or a magnetic tape. Specifically, the "computer readable recording medium" may be a flexible disk, a CD-ROM, a MO disk, a cassette tape, or an open reel tape.

An automatic clock design method for the semiconductor integrated circuit, which is performed by the clock design apparatus shown in FIG. 1, will be described illustratively using the semiconductor integrated circuit shown in FIG. 2. First of all, the semiconductor integrated circuit shown in FIG. 2 will be described below.

Figure 2:
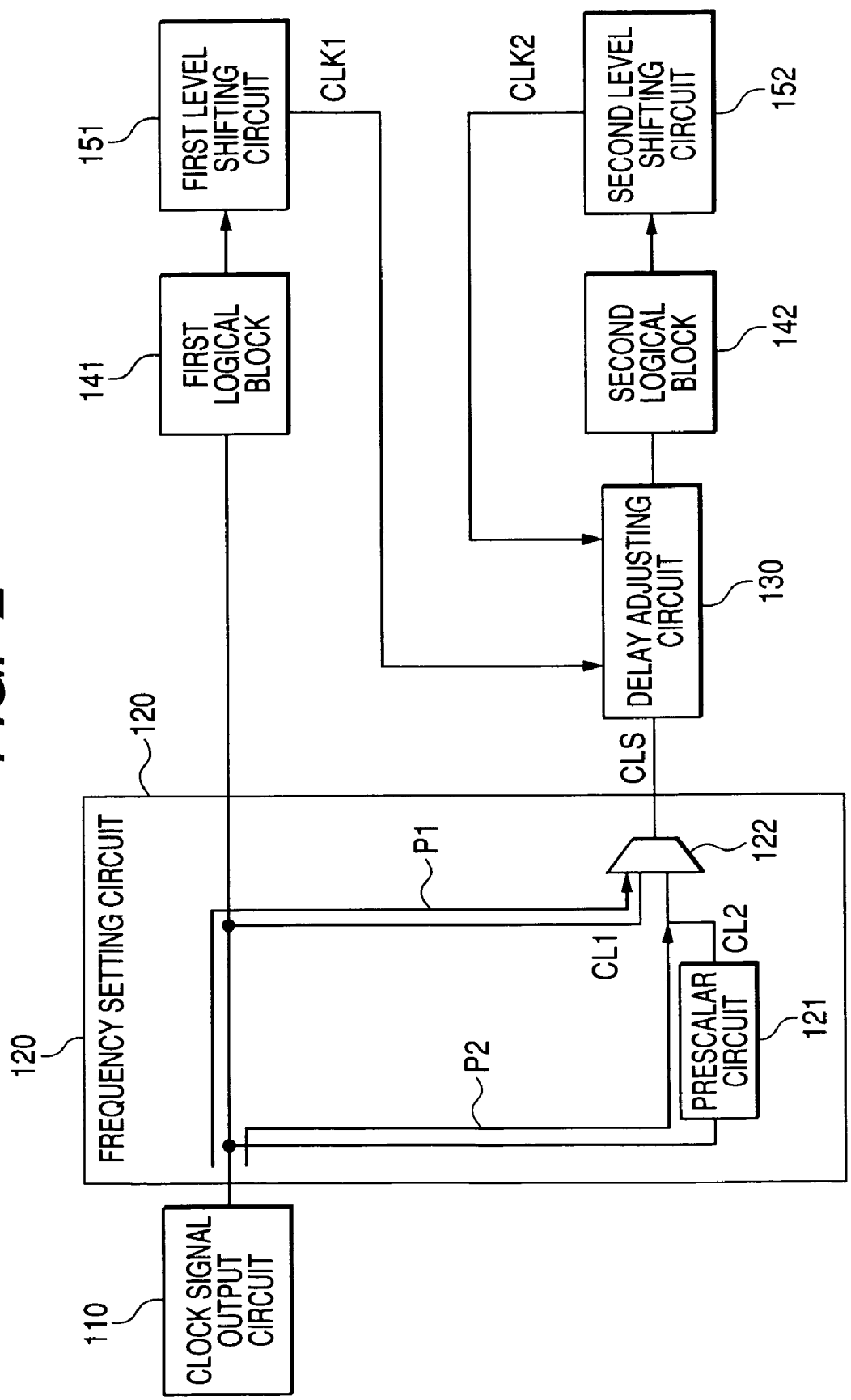
FIG. 2 is a schematic diagram showing an example of the semiconductor integrated circuit in which the clock wiring is designed by the clock design apparatus according to the first embodiment of the invention.

The semiconductor integrated circuit shown in FIG. 2 includes a clock signal output circuit 110, a frequency setting circuit 120, a delay adjusting circuit 130, a first logical block 141, a second logical block 142, a first level shifting circuit 151 and a second level shifting circuit 152. The operating clock frequency and supply voltage of the first logical block 141 are constant. Herein, it is assumed that the operating clock frequency of the first logical clock 141 is frequency f. On the other hand, it is assumed that the operating clock frequency and supply voltage of the second logical block 142 are variable. The operating clock frequency of the second logical clock 142 is set by the frequency setting circuit 120.

The first logical block 141 and the frequency setting circuit 120 are connected to the clock signal output circuit 110. A clock signal CL1 at frequency f output from the clock signal output circuit 110 is input into the first logical block 141 and the frequency setting circuit 120.

The frequency setting circuit 120 includes a prescalar circuit 121 and a selector circuit 122. The clock signal CL1 input into the frequency setting circuit 120 is then input into the selector circuit 122 and the prescalar circuit 121. The prescalar circuit 121 divides the frequency of the input clock signal CL1 by two. Then, the prescalar circuit 121 outputs a clock signal CL2 at frequency f/2 to the selector circuit 122. The selector circuit 122 selects either the clock signal CL1 or the clock signal CL2 in accordance with the frequency of the operating clock frequency set to the second logical block 142, and outputs the selected clock signal to the delay adjusting circuit 130. In the following, the signal output from the selector circuit 122 is designated as a "clock signal CLS". As described above, the frequency setting circuit 120 has a signal propagation path P1 on which the clock signal CL1 at the frequency f propagates and a signal propagation path P2 on which the clock signal CL2 at the frequency f/2 propagates.

The frequency setting circuit 120, the second logical block 142, the first level shifting circuit 151 and the second level shifting circuit 152 are connected to the delay adjusting circuit 130. The clock signal CLS from the frequency setting circuit 120, a clock signal CLK1 from the first level shifting circuit 151, and a clock signal CLK2 from the second level shifting circuit 152 are input into the delay adjusting circuit 130. The delay adjusting circuit 130 adjusts delay time of the clock signal CLS so that the clock signal CLK1 and the clock signal CLK2 are synchronized with each other. The delay adjusting circuit 130 outputs a clock signal CLS2 whose delay time has been adjusted, to the second logical block 142.

The first level shifting circuit 151 and the second level shifting circuit 152 shift voltage levels of the clock signals output from the first logical block 141 and the second logical block 142 to be identical to each other. Then, the first level shifting circuit 151 and the second level shifting circuit 152 output the clock signals whose voltage levels have been shifted, as a clock signal CLK1 and a clock signal CLK2 to the delay adjusting circuit 130, respectively.

Figure 3:
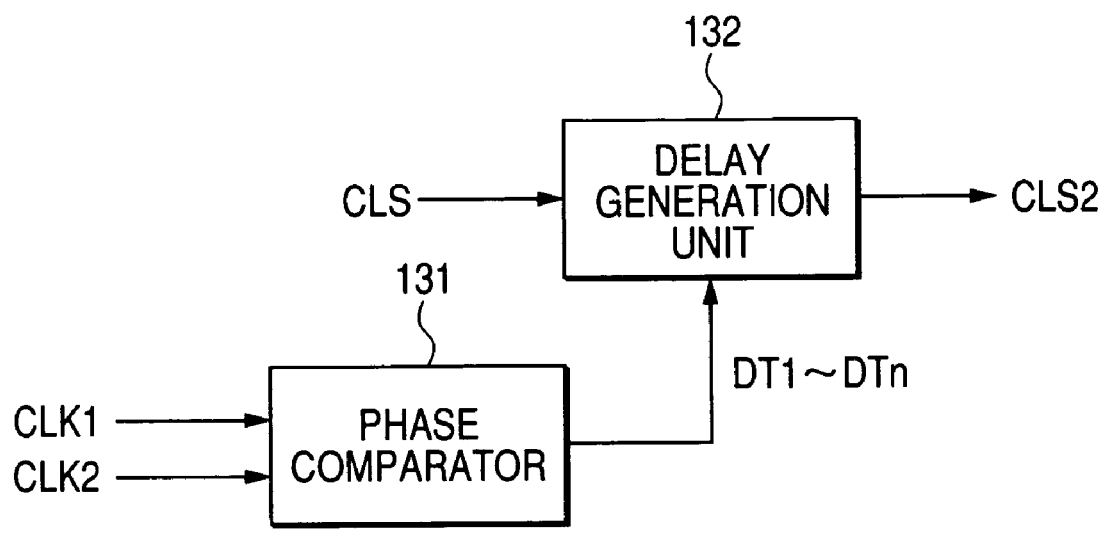
FIG. 3 is a schematic diagram showing an example of a delay adjusting circuit provided for the semiconductor integrated circuit shown in FIG. 2.

Herein, the delay adjusting circuit 130 will be described below. FIG. 3 shows a configuration example of the delay adjusting circuit 130. The delay adjusting circuit 130 shown in FIG. 3 includes a phase comparator 131 and a delay generation unit 132. The phase comparator 131 compares phase of the clock signal CLK1 and phase of the clock signal CLK2. If the phase of the clock signal CLK1 is earlier than the phase of the clock signal CLK2, the delay time from inputting the clock signal CLS into the delay generation unit 132 to outputting it is set to be shorter. That is, the phase of the clock signal CLS is advanced so that the clock signal CLK1 and the clock signal CLK2 are synchronized in phase. On the other hand, if the phase of the clock signal CLK1 is later than the phase of the clock signal CLK2, the delay time from inputting the clock signal CLS into the delay generation unit 132 to outputting it is set to be longer. That is, the phase of the clock signal CLS is delayed so that the clock signal CLK1 and the clock signal CLK2 are synchronized in phase.

Figure 4:
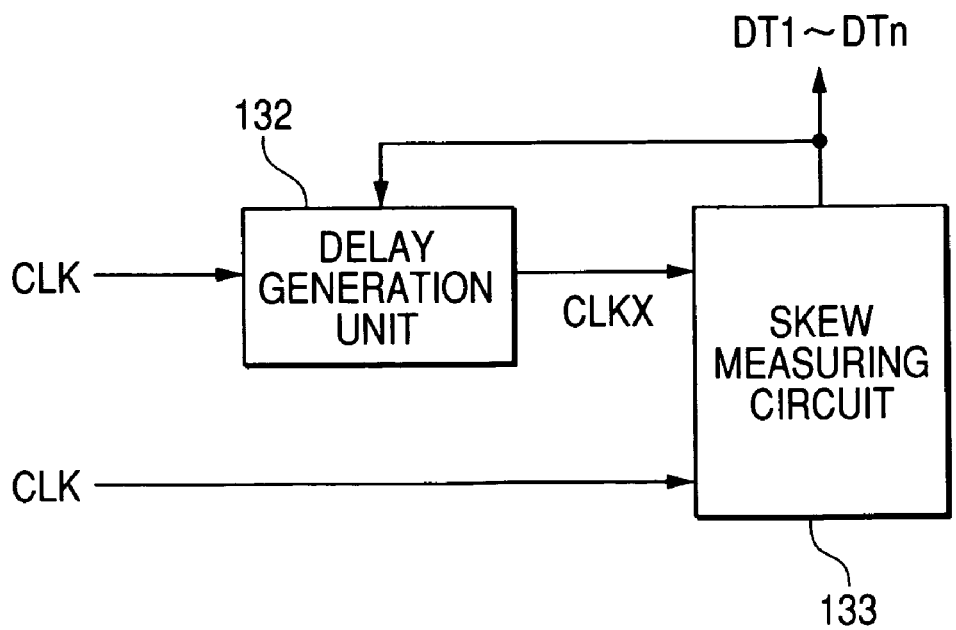
FIG. 4 is a schematic diagram showing an example of a phase comparator of the delay adjusting circuit shown in FIG. 3.

FIG. 4 shows an example of the phase comparator 131. The skew measuring circuit 133 shown in FIG. 5 includes a plurality of delay generation units 1311 to 131n, a plurality of latch circuits L1 to Ln and a plurality of output sections T1 to Tn (where n is an integer of 2 or greater).

Figure 5:
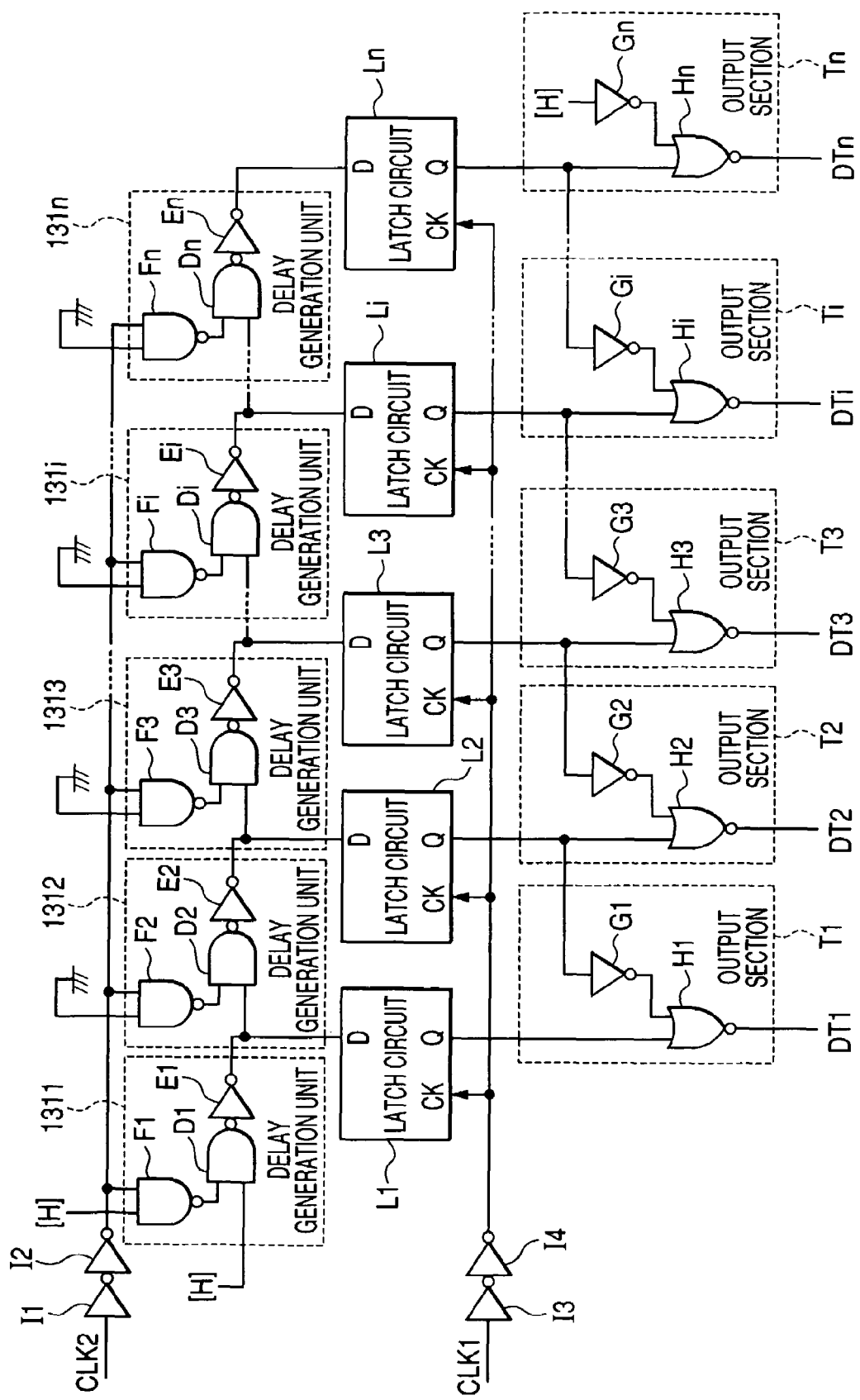
FIG. 5 is a schematic diagram showing an example of a skew measuring circuit of the delay adjusting circuit shown in FIG. 3.

The delay generation units 1311 to 131n include NAND circuits F1 to Fn, NAND circuits D1 to Dn, and inverters E1 to En, respectively. As shown in FIG. 5, the delay generation units 1311 to 131n are cascade-connected. For example, an output of the delay generation unit 1311 is input into the delay generation unit 1312. The clock signal CLK2 is input into one input port of each of the NAND circuits F1 to Fn via the inverters 11 and 12. The other input port of the NAND circuit F1 is fixed at high (H) level, and the other input ports of each of the NAND circuits F2 to Fn are fixed at low (L) level. The outputs of the NAND circuits F1 to Fn are input into one input ports of the NAND circuits D1 to Dn, respectively. The outputs of the NAND circuits D1 to Dn are input into the inverters E1 to En, respectively. The outputs of the inverters E1 to En are input into data input ports D of the latch circuits L1 to Ln, respectively. Also, the outputs other than that of the inverter En are input into the other input ports of the NAND circuits D2 to Dn of the delay generation units 1312 to 131n at the next stage, respectively. The other input port of the NAND circuit D1 is fixed at H level.

The clock signal CLK1 is input via the inverters 13 and 14 into clock ports CK of the latch circuits L1 to Ln. Outputs of the latch circuits L1 to Ln are input into the output sections T1 to Tn, respectively. Each of the latch circuits L1 to Ln latches a value when a value of the clock port CK is at H level, and pass the value of the data input port D to the output port Q when it is at L level.

The output sections T1 to Tn includes inverters G1 to Gn and OR circuits H1 to Hn, respectively. The outputs of the latch circuits L1 to Ln are input into one input ports of the OR circuits H1 to Hn, respectively. The outputs of the inverters G1 to Gn are input into the other input ports of the OR circuits H1 to Hn. The outputs of the latch circuits L2 to Ln are input into input ports of the inverters G1 to $G_{n-1}$, respectively. The input port of the inverter Gn is fixed at H level.

If the clock signal CLK2 switches from L level to H level shown in FIG. 5, the output of the NAND circuit F1 of the delay generation unit 1311 becomes L level. After the pulse signal propagates through the NAND circuit D1 and the inverter E1, the output of the inverter E1 changes from H level to L level. Herein, it is assumed that a sum of signal delay time of the NAND circuit D1 and that of the inverter E1, a sum of signal delay time of the NAND circuit D2 and that of the inverter E2, . . . , and a sum of signal delay time of the NAND circuit Dn and that of the inverter En are equal to the signal delay time td1. That is, the output of the inverter E1 becomes L level after the signal delay time td1 since the output of the NAND circuit F1 has become L level.

Moreover, the output of the inverter E2 becomes L level after the pulse signal propagates through the NAND circuit D2 and the inverter E2 of the delay generation unit 1312 at the next stage, namely, after the signal delay time td1. Likewise, the outputs of the inverters E1 to En successively change to L level every signal delay time td1. If the clock signal CLK1 switches from L level, the latch circuits L1 to Ln latch the outputs of the inverters E1 to En, respectively. That is, if the clock signal CLK1 becomes H level when the pulse passes through the i-th delay generation unit 131i, the outputs of the inverters E1 to Ei become L level (i is an integer from 2 to n). On the other hand, the outputs of the inverters $E_{i+1}$ to En are at H level. Consequently, only the output DTi of the i-th output section T1 among the outputs DT1 to DTn of the output sections T1 to Tn become H level. That is, the skew measuring circuit 133 shown in FIG. 5 measures the time between the rise edge of the clock signal CLK2 and that of the clock signal CLK1 in units of the signal delay time td1.

Figure 6:
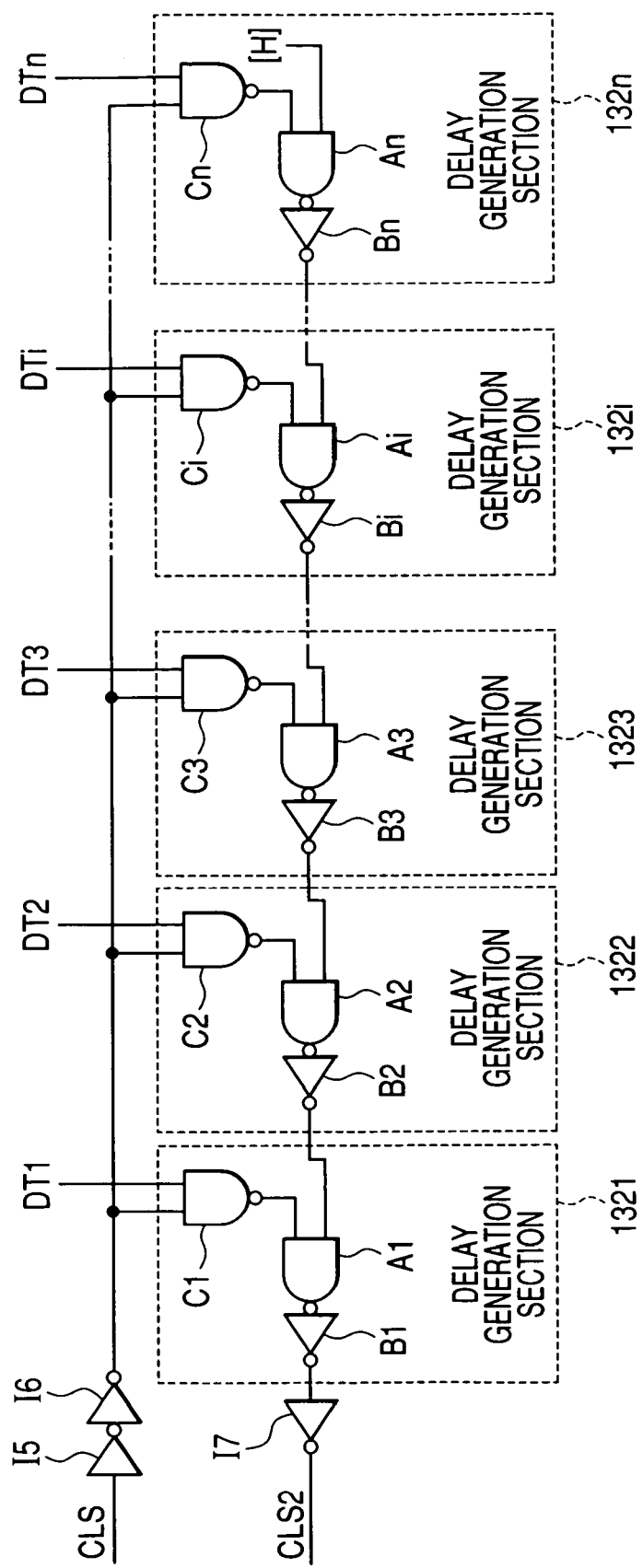
FIG. 6 is a schematic diagram showing an example of a delay generation unit of the delay adjusting circuit as shown in FIG. 3.

The outputs DT1 to DTn of the output section T1 to Tn are input into the delay generation unit 132 having the configuration shown in FIG. 6. The delay generation unit 132 shown in FIG. 6 includes the delay generation sections 1321 to 132n. As shown in FIG. 6, the delay generation sections 1321 to 132n are cascade-connected. For example, an output of the delay generation section 1322 is input into the delay generation section 1321. The delay generation sections 1321 to 132n include NAND circuits A1 to An, inverters B1 to Bn, and NAND circuits C1 to Cn, respectively.

The clock signal CLS is input into one input ports of the NAND circuits C1 to Cn via the inverters I5 and I6. The outputs DT1 to DTn of the output sections T1 to Tn shown in FIG. 5 are input into the other input ports of the NAND circuits C1 to Cn, respectively. Outputs of the NAND circuits C1 to Cn are input into one input ports of the NAND circuits A1 to An, respectively. Outputs of the NAND circuits A1 to An are input into the inverters B1 to Bn, respectively. Outputs of the inverters B2 to Bn are input into the other input ports of the NAND circuits A1 to $A_{n-1}$ of the delay generation sections 1321 to $132_{n-1}$ at the next stage, respectively. The inverter B1 outputs the clock signal CLS2 via the inverter 17.

When the output DTi of the i-th output section Ti is at H level, the clock signal CLS propagates through the NAND circuit Ci, the NAND circuit Ai and the inverter Bi of the delay generation section 132i, and is input into the delay generation section $132_{i-1}$. Then, the clock signal CLS propagates through the delay generation section $132_{i-1}$ to 1321 in succession, and is output from the inverter 17. Delay time of the clock signal CLS in the delay generation section 132i is decided by signal delay time of the NAND circuit Ai and that of the inverter Bi. Herein, it is assumed that a sum of the signal delay time of the NAND circuit A1 and that of the inverter B1, a sum of the signal delay time of the NAND circuit A2 and that of the inverter B2, . . . , a sum of the signal delay time of the NAND circuit An and that of the inverter Bn are equal to signal delay time td2. That is, the delay generation unit 132 shown in FIG. 6 outputs the input clock signal CLS after delay time, which is expressed in units of the delay time td2.

Accordingly, the delay time of the clock signal CLS is adjusted so that the clock signal CLK1 and the clock signal CLK2 are synchronized with each other by designing the signal delay time td1 and the signal delay time td2 to be equal to each other.

It is noted that examples of the phase comparator 131 and the delay generation unit 132 are detailed in U.S. patent application Ser. Nos. 10/990,537 and 11/271,848, entire contents of which are incorporated herein by reference.

Figure 7:
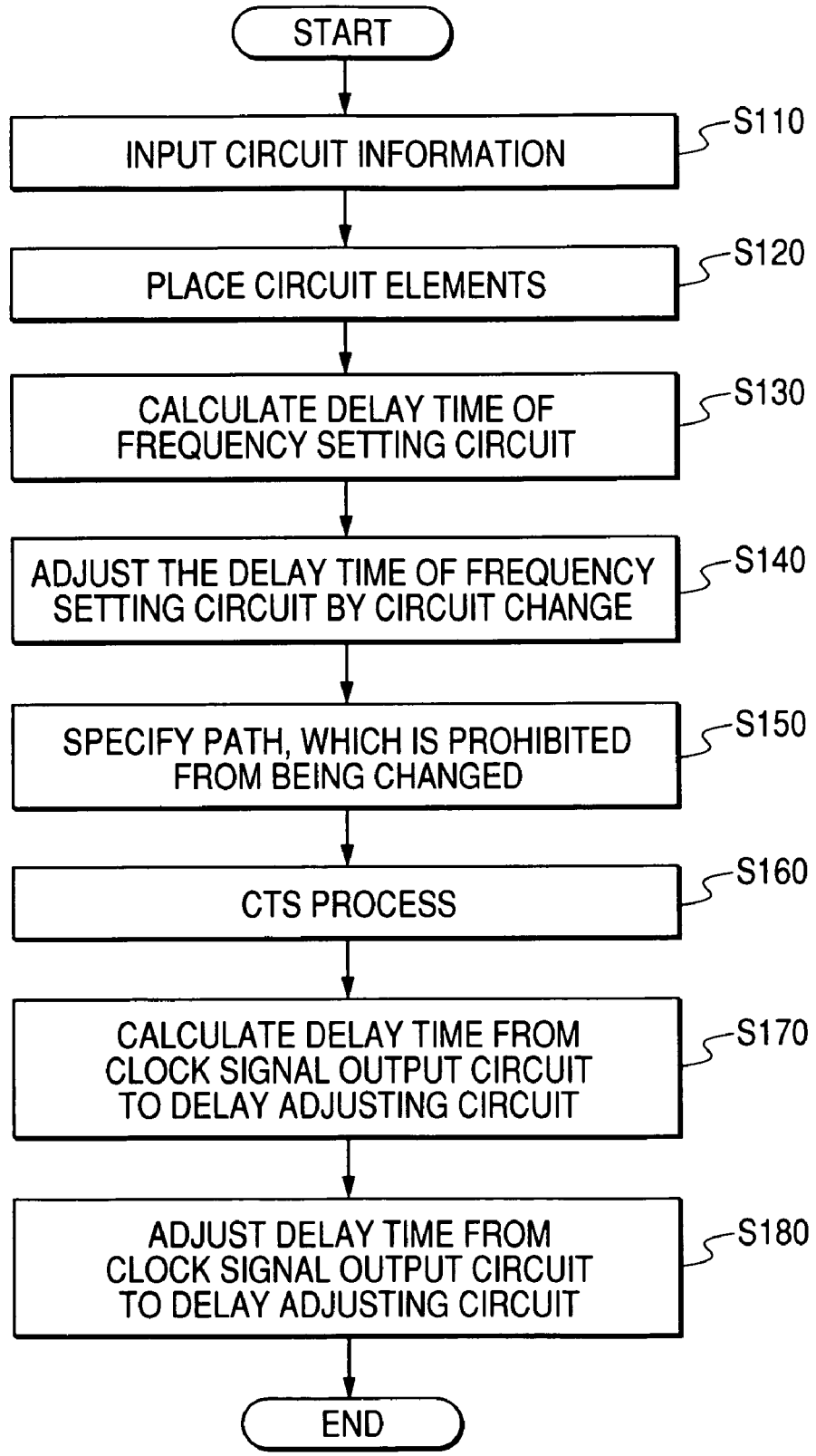
FIG. 7 is a flowchart for explaining a clock design method according to the first embodiment of the invention.

Referring to a flowchart of FIG. 7, an example of the automatic clock design method for the semiconductor integrated circuit, which is performed by the clock design apparatus shown in FIG. 1, will be described below.

(1) At step S110, circuit information of a semiconductor integrated circuit is stored in the circuit information storage area 21 via the input device 3 shown in FIG. 1.

(2) At step S120, the circuit element placement section 10 reads the circuit information from the circuit information storage area 21. Then, the circuit element placement section 10 places circuit elements, based on the circuit information of the semiconductor integrated circuit shown in FIG. 2. Placement information of the circuit elements is stored in the element placement storage area 22.

(3) At step S130, the calculating section 111 reads the placement information of the circuit elements from the element placement storage area 22. Then, the calculating section 111 calculates signal delay time tp1 of the signal propagation path P1 and signal delay time tp2 of the signal propagation path P2 in the frequency setting circuit 120, based on the placement information of the circuit elements. Herein, it is assumed that wiring of the signal propagation path P1 is designed so that the wiring connecting the clock signal output circuit 110 and the selector circuit 122 is shortest. Likewise, it is assumed that the wiring of the signal propagation path P2 is designed so that the wiring connecting the clock signal output circuit 110, the prescalar circuit 121 and the selector circuit 122 is shortest. To calculate the signal delay time tp1 and the signal delay time tp2, a circuit simulation using an input vector or a static delay time analysis without using the input vector may be employed. The calculated signal delay time tp1 and the signal delay time tp2 are stored in the delay time storage area 23.

Figure 8:
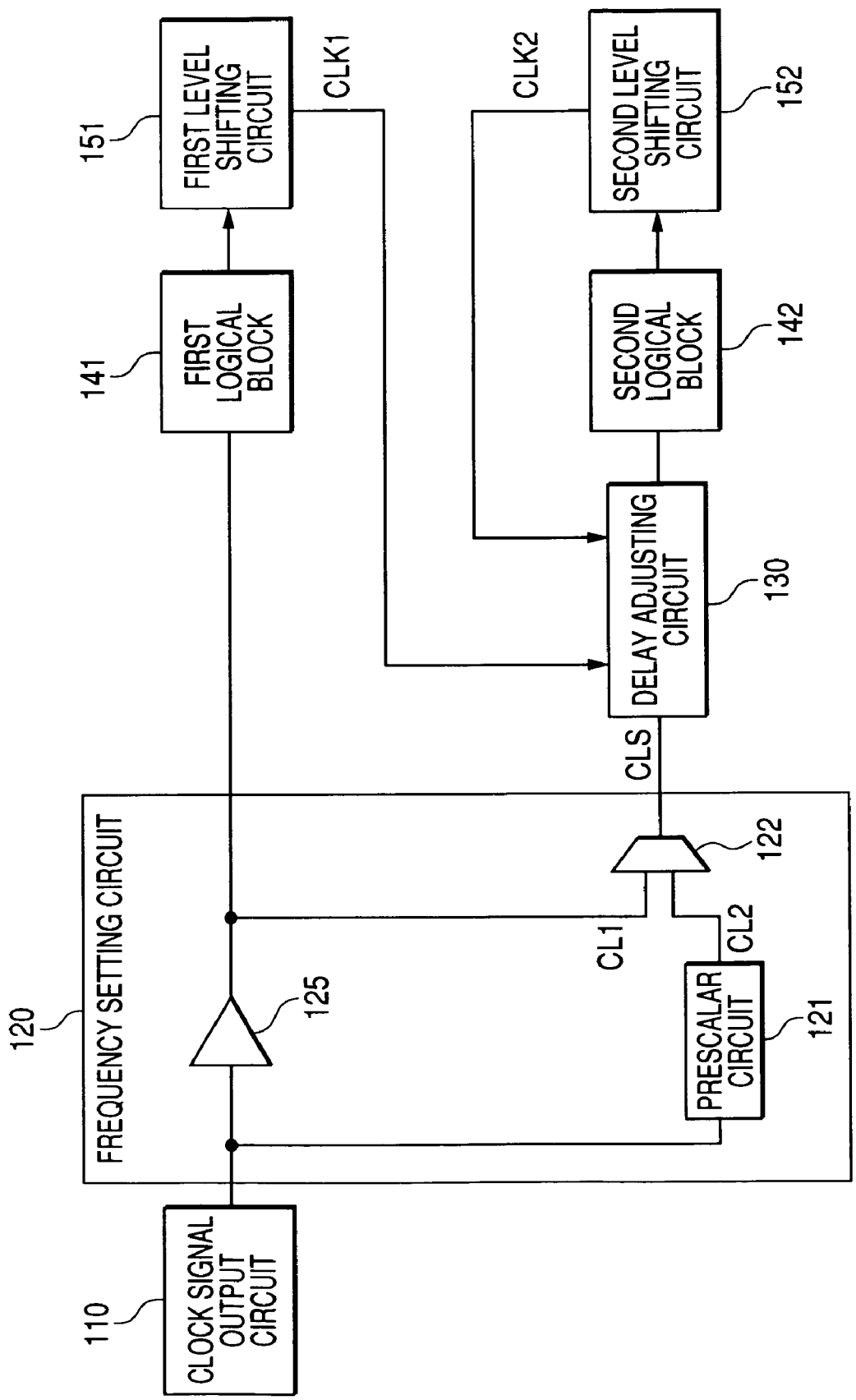
FIG. 8 is a schematic diagram (no. 1) of the semiconductor integrated circuit whose clock wiring is designed by the clock design method according to the first embodiment of the invention.

(4) At step S140, the changing section 112 reads the placement information of the circuit elements from the element placement storage area 22, and the signal delay time tp1 and the signal delay time tp2 from the delay time storage area 23. Then, the changing section 112 makes circuit change so that the signal delay time tp1 and the signal delay time tp2 are equal to each other. For example, a buffer circuit 125 is inserted into the signal propagation path P1, as shown in FIG. 8. New placement information of the circuit elements—for which the delay time adjusting section 11 has adjusted the signal delay time—is stored in the element placement storage area 22 over the placement information of the circuit elements before adjusting the signal delay time.

(5) At step S150, the prohibition specifying section 12 reads the placement information of the circuit elements from the element placement storage area 22. Then, the prohibition specifying section 12 specifies the signal propagation path P1, the signal propagation path P2, a signal propagation path from the selector circuit 122 to the delay adjusting circuit 130, the selector circuit 122 and the delay adjusting circuit 130, as a circuit prohibited from being changed. The new placement information of the circuit elements—for which the prohibition of the circuit change is specified—is stored in the element placement storage area 22 over the placement information of circuit elements before specifying the prohibition.

Figure 9:
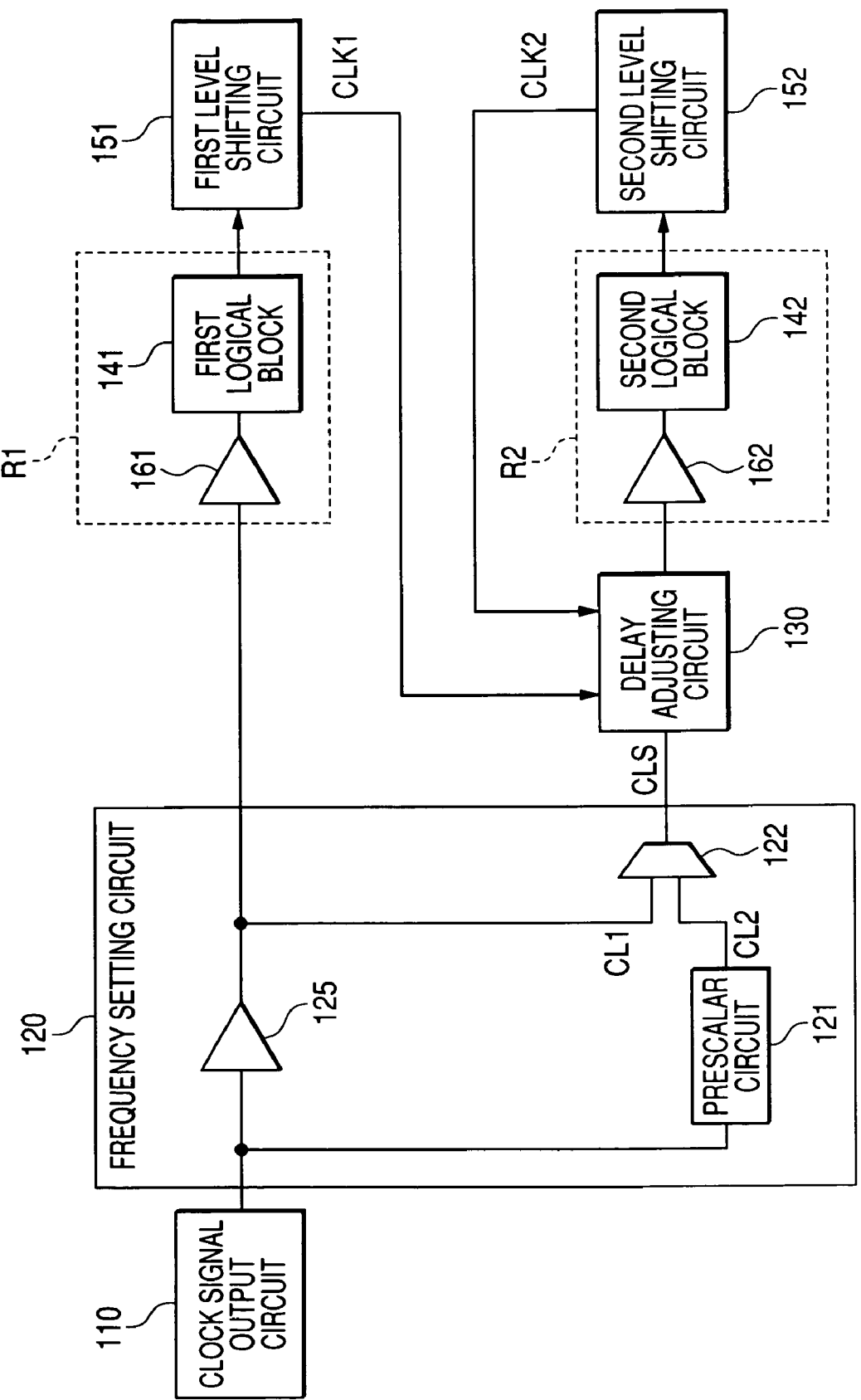
FIG. 9 is a schematic diagram (no. 2) of the semiconductor integrated circuit whose clock wiring is designed by the clock design method according to the first embodiment of the invention.

(6) At step S160, the clock tree synthesis section 13 reads the placement information of the circuit elements from the element placement storage area 22. Then, the clock tree synthesis section 13 performs the CTS process for clock synchronization type storage elements in the first logical block 141 and the second logical block 142 with the clock signal output circuit 110 taken as a start point. The clock synchronization type storage element may be a flip-flop or a memory. In the CTS process, the circuit is changed so that signal delay times from the clock signal output circuit 110 to the respective clock synchronization type storage elements are equal to each other. Then, for example, a buffer circuit is added. However, the buffer circuit is not added to the signal propagation path and circuit, which are specified as a circuit prohibited from being changed. Therefore, places to which buffer circuits can be added are signal propagation path included in circuit areas R1 and R2 shown in FIG. 9. FIG. 9 shows an example in which a buffer circuit 161 is inserted at a preliminary stage of the first logical block 141 and a buffer circuit 162 is inserted at a preliminary stage of the second logical block 142. The signal propagation path from the clock signal output circuit 110 to the second logical block 142 is in two ways, that is, the signal propagation path P1 and the signal propagation path P2, any of which may be selected in the CTS process. This is because the signal delay time tp1 of the signal propagation path P1 and the signal delay time tp2 of the signal propagation path P2 have been adjusted at step S140 to be identical. Layout information of the semiconductor integrated circuit subjected to the CTS process is stored in the layout information storage area 24.

(7) At step S170, the calculating section 111 reads the layout information from the layout information storage area 24. Then, the calculating section 111 calculates the signal delay time $Td_A$ of the following signal propagation path A and the signal delay time $Td_B$ of the following signal propagation path B, based on the layout information.

Signal propagation path A: From the clock signal output circuit 110 through the first logical block 141 and the first level shifting circuit 151 to the delay adjusting circuit 130

Signal propagation path B: From the clock signal output circuit 110 through the delay adjusting circuit 130, the second logical block 142 and the second level shifting circuit 152 to the delay adjusting circuit 130

Since the signal delay time tp1 and the signal delay time tp2 have been adjusted to be identical to each other, any of the signal propagation path P1 and the signal propagation path P2 may be selected in calculating the signal delay time $Td_B$. The calculated signal delay time $Td_A$ and $Td_B$ are stored in the delay time storage area 23.

Figure 10:
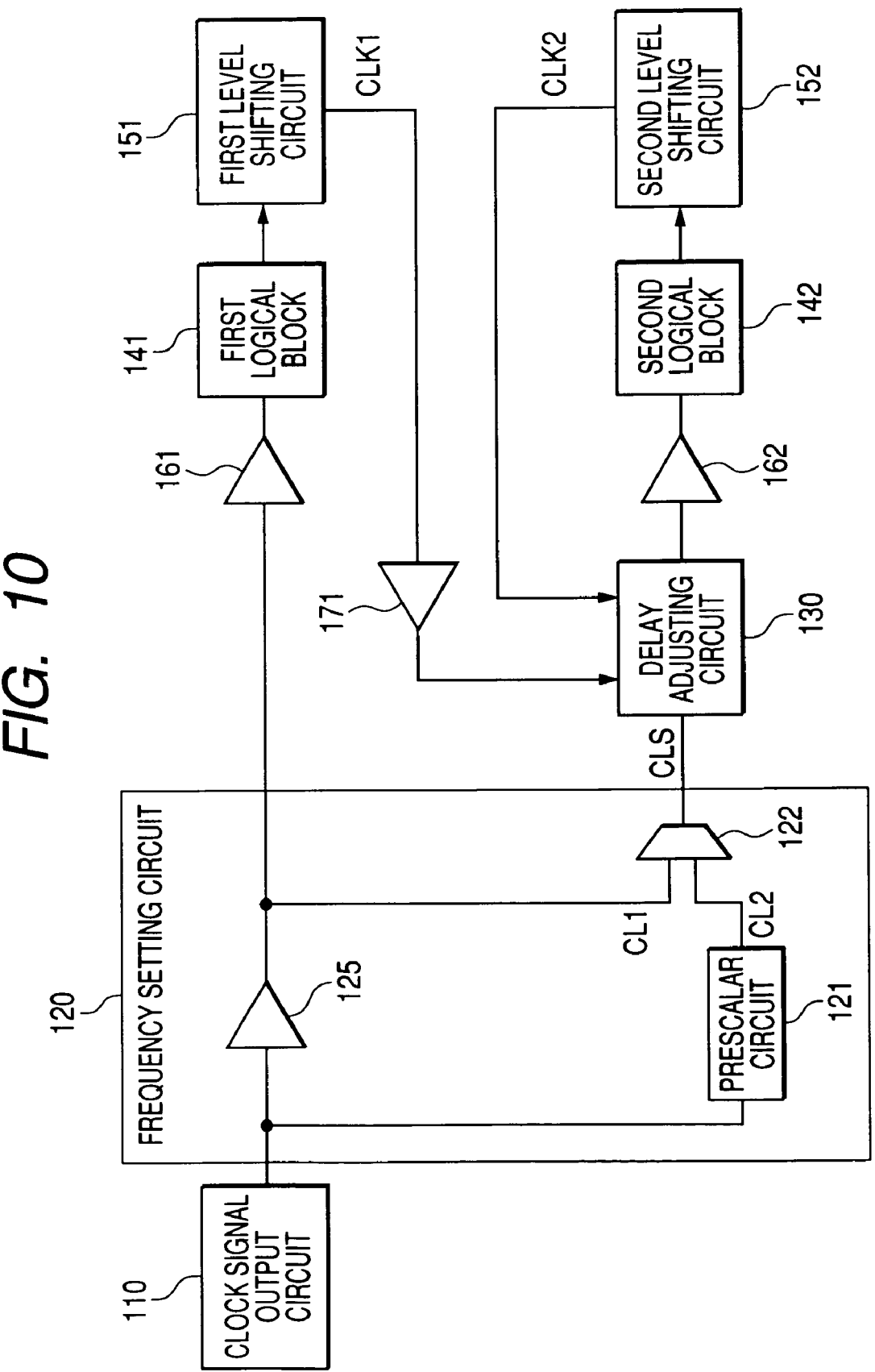
FIG. 10 is a schematic diagram (no. 3) of the semiconductor integrated circuit whose clock wiring is designed by the clock design method according to the first embodiment of the invention.

(8) At step S180, the changing section 112 reads the layout information from the layout information storage area 24, and the signal delay time $Td_A$ and the signal delay time $Td_B$ from the delay time storage area 23. Then, the changing section 112 changes the circuit so that the signal delay times $Td_A$ and $Td_B$ are equal to each other. At this time, the supply voltage of the second logical block 142 is set to an initial value, and a delay value corresponding to the supply voltage of the second logical block 142 is set to the delay adjusting circuit 130. The initial value of supply voltage is the supply voltage set to a circuit such as the first logical block 141 before changing the supply voltage in accordance with a workload on the second logical block 142. FIG. 10 shows an example where a buffer circuit 171 is inserted between the first level shifting circuit 151 and the delay adjusting circuit 130. The new layout information—for which the delay time adjusting section has adjusted the signal delay time—is stored in the layout information storage section 24 over the layout information before adjusting the signal delay time.

As described above, according to the clock design apparatus of the first embodiment, first of all, of the delay time of the clock signal, which is caused by change in the supply voltage of the second logical block 142, the delay time of the clock signal—which is caused by the frequency setting circuit 120 and cannot be adjusted by the delay adjusting circuit 130—is adjusted. Then, a circuit portion for which the clock has already been adjusted is prohibited from being changed. Delay time of a clock signal, which is caused by a circuit portion for which the delay adjusting circuit 130 can adjust delay of a clock signal, is adjusted. As a result, the clock skew in the semiconductor integrated circuit including the logical block whose clock frequency and supply voltage are changed according to the workload can be reduced.

In the above explanation, the CTS process for the clock signal output circuit 110 to the first logical block 141 and the second logical block 142 is performed at step S160, and the signal delay times of the signal propagation paths A and B are adjusted at steps S170 and S180. That is, the signal delay times from the first logical block 141 and the second logical block 142 to the delay adjusting circuit 130 are adjusted at steps S170 and S180. However, the adjustments for the signal delay time performed at step S160 and steps S170 and S180 may be performed in a single CTS process. That is, the clock tree synthesis section 13 may adjust the signal delay time from the clock signal output circuit 110 to the delay adjusting circuit 130 in a single CTS process.

The buffer circuit is added to adjust the signal delay times tp1 and tp2, or the signal delay times $Td_A$ and $Td_B$. Therefore, the buffer circuit may be prepared in an area where the clock wiring is expected to be routed. As a result, if the buffer circuit is added later, a situation where there is no enough space to place the buffer circuit is avoided. After all the design processes are ended, the buffer circuit may be inserted, based on the signal delay information of the actual wiring. A circuit in which a plurality of buffer circuits are connected in series may be prepared, and the buffer circuits of required stages may be employed.

<Modification>

Figure 11:
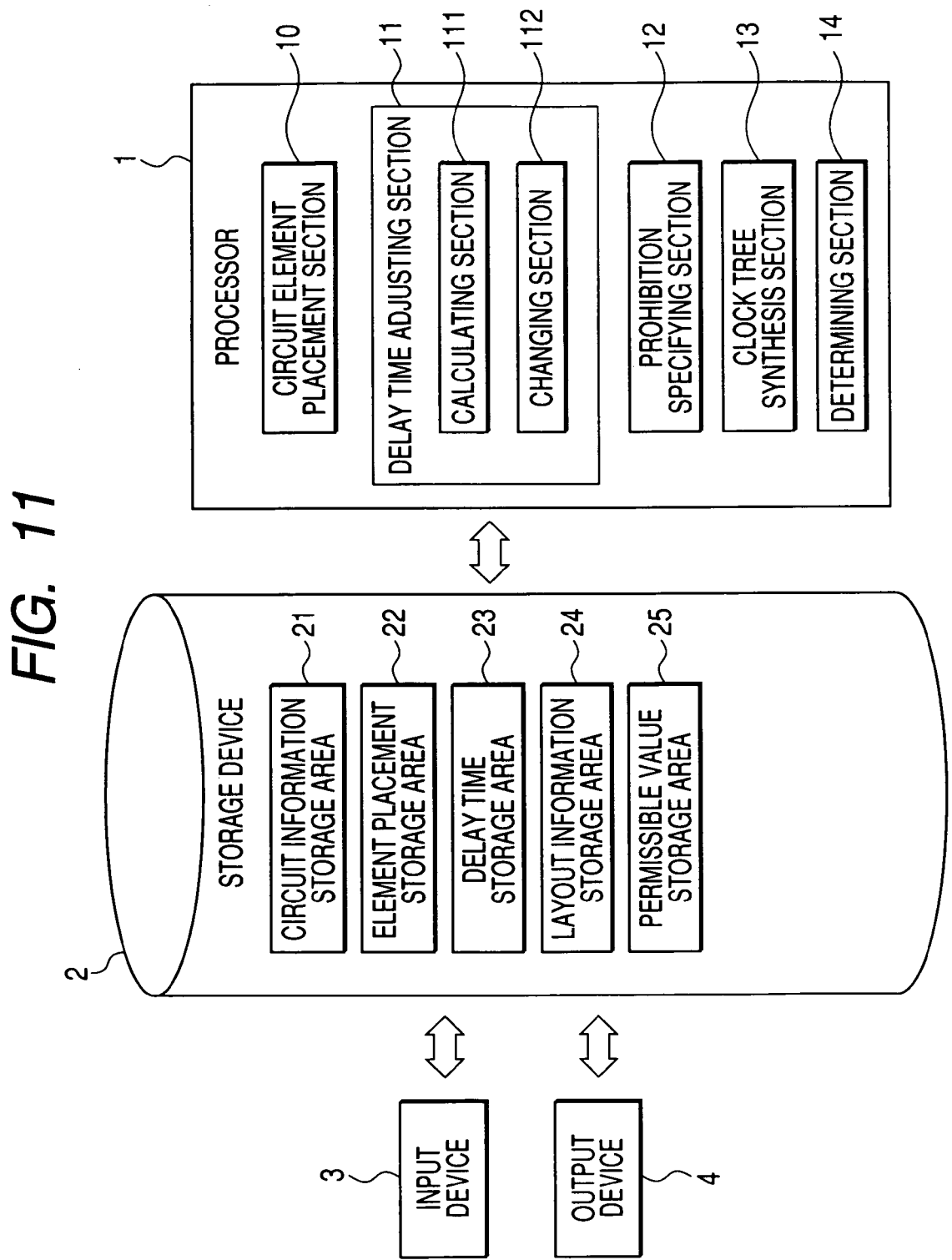
FIG. 11 is a schematic diagram showing the configuration of a clock design apparatus according to a modification of the first embodiment of the invention.

FIG. 11 shows a clock design apparatus according to a modification of the first embodiment of the invention. The clock design apparatus shown in FIG. 11 is different from that of FIG. 1 in that a determining section 14 and a permissible value storage area 25 are further provided. The determining section 14 determines whether or not the clock skew of the logical block satisfies a predetermined permissible value. The predetermined permissible value of the clock skew is stored in the permissible value storage area 25. The permissible value is set to reduce a clock skew difference between plural logical blocks contained in the semiconductor integrated circuit.

For example, in the case where there is a great difference between the clock skew within the first logical block 141 and that within the second logical block 142 shown in FIG. 2, it may take a longer time to adjust the signal delay time or perform the CTS process to reduce the clock skew between the first logical block 141 and the second logical block 142 with the automatic clock design method as described above. Therefore, after the clock skew within the first logical block 141 and that within the second logical block are made the predetermined permissible value or less, the clock design is performed, which is effective to reduce the clock skew of the entire semiconductor integrated circuit.

Figure 12:
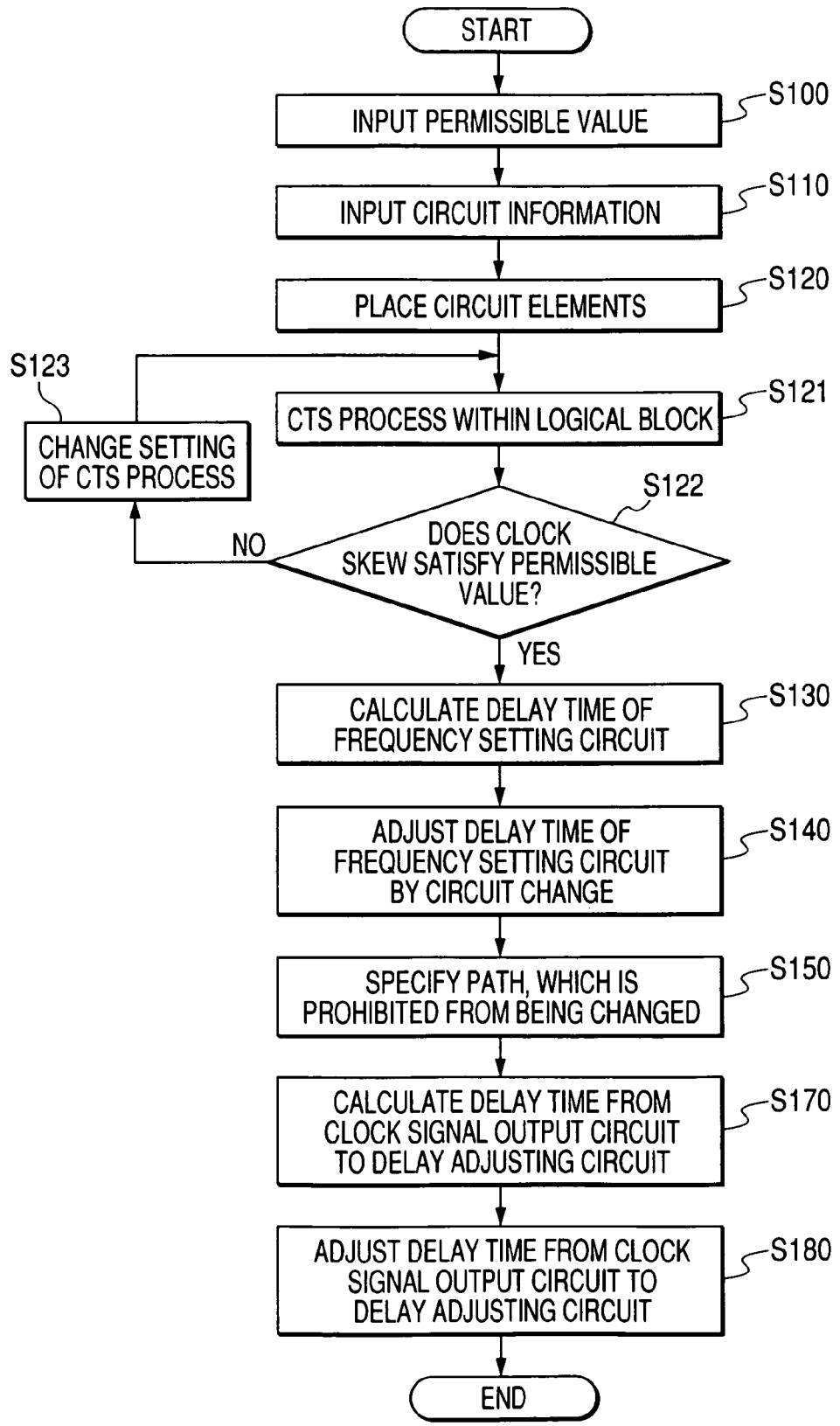
FIG. 12 is a flowchart for explaining a clock design method according to the modification of the first embodiment of the invention.

Referring to a flowchart of FIG. 12, a method for reducing the clock skew between logical blocks by determining whether or not the clock skew within each logical block satisfies the predetermined permissible value with the clock design apparatus shown in FIG. 11 will be described below.

(1) At step S100, the permissible value of clock skew within the logical block is stored in the permissible value storage area 25 via the input device 3 shown in FIG. 11. Further, at step S110, the circuit information of the semiconductor integrated circuit shown in FIG. 2 is stored in the circuit information storage area 21. Then, at step S120, the circuit element placement section 10 reads the circuit information from the circuit information storage area 21. The circuit element placement section 10 places the circuit elements, based on the circuit information of the semiconductor integrated circuit. The placement information of circuit elements is stored in the element placement storage area 22.

(2) At step S121, the clock tree synthesis section 13 reads the placement information of the circuit elements from the element placement storage area 22. Then, the clock tree synthesis section 13 performs the CTS process for the clock synchronization type storage elements within the first logical block 141 and the second logical block 142 shown in FIG. 2. The layout information of the first logical block 141 and the second logical block 142 for which the CTS process has been performed is stored in the layout information storage area 24.

(3) At step S122, the determining section 14 reads the layout information of the first logical block 141 and the layout information of the second logical block 142 from the layout information storage area 24, and the permissible value of the clock skew from the permissible value storage area 25. Then, the determining section 14 determines whether or not the clock skew within the first logical block 141 and the clock skew within the second logical block 142 satisfy the permissible value. If both the clock skew within the first logical block 141 and the clock skew within the second logical block 142 satisfy the permissible value, the procedure goes to step S130 to perform the same process as described above with reference to FIG. 7. It is noted that since the CTS process is ended at step S121 in FIG. 12, the CTS process at step S160 in FIG. 7 is not performed. On the other hand, if any of the clock skew within the first logical block 141 and the clock skew within the second logical block 142 does not satisfy the permissible value, the procedure goes to step S123.

(4) At step S123, the clock tree synthesis section 13 changes the settings of the CTS process. The settings to be changed include set number of stages of the buffer circuit inserted into the signal propagation path in the CTS process, and set fan-out number of the buffer circuit, for example. Then, the procedure returns to step S121.

In the clock design apparatus shown in FIG. 11, the clock design of the semiconductor integrated circuit is performed after the clock skews within each logical blocks are made the permissible value or less. Therefore, according to the clock design apparatus of the modification of the first embodiment of the invention, even if there is a great difference between clock skews within logical blocks of the semiconductor integrated circuit, the clock skew of the entire semiconductor integrated circuit can be reduced efficiently in a short time.

Second Embodiment

Figure 13:
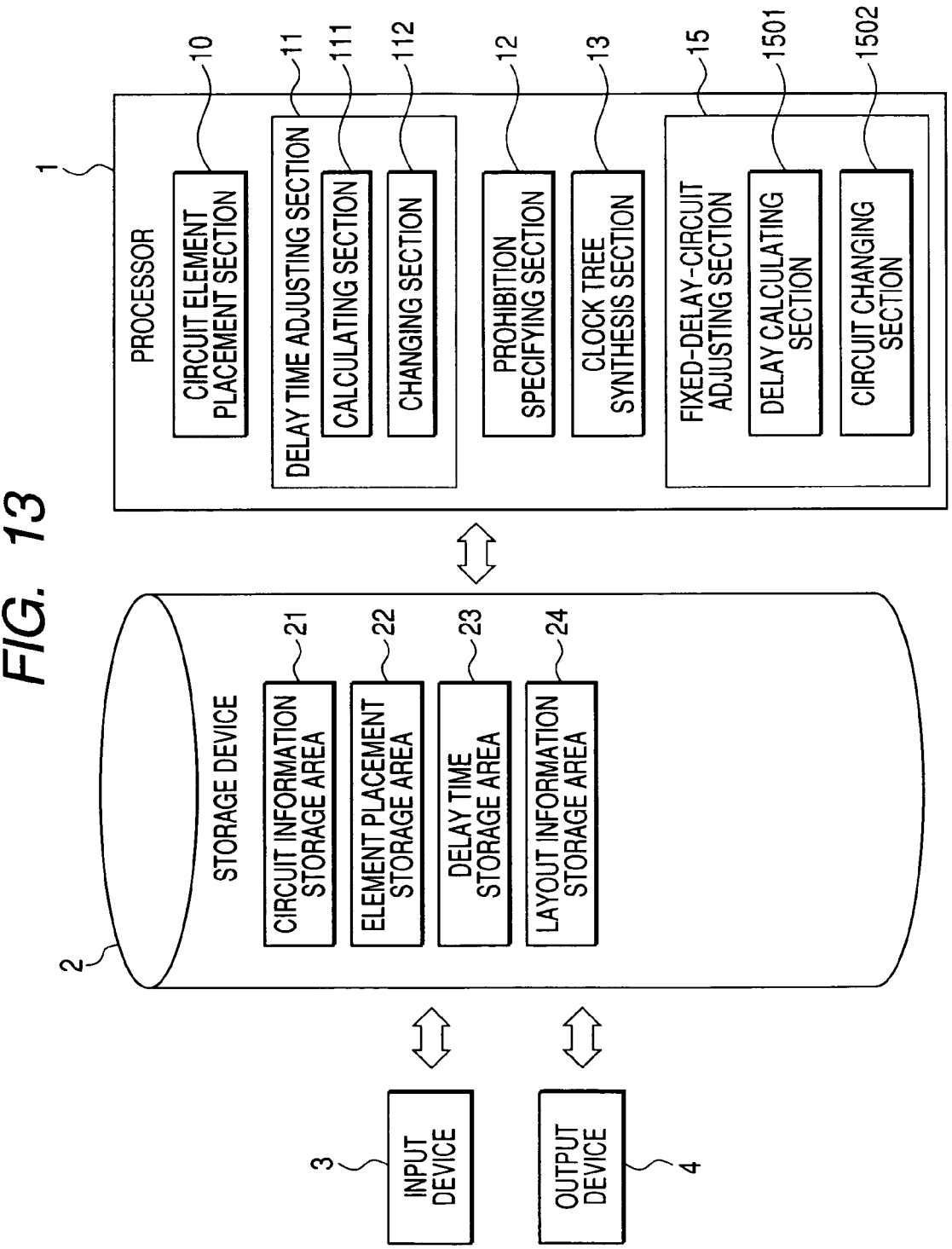
FIG. 13 is a schematic diagram showing the configuration of a clock design apparatus according to a second embodiment of the invention.

A clock design apparatus according to a second embodiment of the invention is different from that of FIG. 1 in that it further comprises a fixed-delay-circuit adjusting section 15, as shown in FIG. 13. The other configuration is the same as the first embodiment shown in FIG. 1. The fixed-delay-circuit adjusting section 15 adjusts the signal delay time in each of plural fixed delay generation units contained in the semiconductor integrated circuit.

The fixed-delay-circuit adjusting section 15 includes a delay calculating section 1501 and a circuit changing section 1502. The delay calculating section 1501 calculates the signal delay time of a fixed delay generation unit. The circuit changing section 1502 changes the fixed delay generation unit by inserting a buffer circuit.

An automatic clock design method for the semiconductor integrated circuit, which is performed by the clock design apparatus shown in FIG. 13, will be described below illustratively, using the semiconductor integrated circuit FIG. 14. First of all, the semiconductor integrated circuit shown in FIG. 14 will be described below.

The settable frequency in the frequency setting circuit 120 shown in FIG. 2 is in two ways, that is, frequency f or frequency f/2. However, the semiconductor integrated circuit shown in FIG. 14 includes a frequency setting circuit 120A capable of setting k kinds of operating clock frequency (k is a natural number). Further, the semiconductor integrated circuit shown in FIG. 14 is different from the semiconductor integrated circuit of FIG. 2 in that it includes a delay setting circuit 180 capable of k kinds of signal delay time. The delay adjusting circuit 130 is contained in the delay setting circuit 180, as shown in FIG. 14.

Even if the logical block whose the operating clock frequency and the supply voltage are variable is employed, such a logical block may be used with the operating clock frequency and the supply voltage fixed. The semiconductor integrated circuit shown in FIG. 14 does not necessarily employ the delay adjusting circuit 130, when the operating clock frequency and supply voltage of the second logical block 142 are fixed. If the delay adjusting circuit 130 is not employed, the electric power consumed by the delay adjusting circuit 130 can be reduced. In the semiconductor integrated circuit shown in FIG. 14, the operating clock frequency and the signal delay time are set by the frequency setting circuit 120A and the delay setting circuit 180 in accordance with the operating clock frequency and the supply voltage of the second logical block 142, respectively.

The first logical block 141 and the frequency setting circuit 120A are connected to the clock signal output circuit 110. The clock signal CL1 of the frequency f output from the clock signal output circuit 110 is input into the first logical block 141 and the frequency setting circuit 120A.

The frequency setting circuit 120A includes the prescalar circuits 1212 to 121k and a selector circuit 122. A clock signal CL1 input into the frequency setting circuit 120A is input into the selector circuit 122 and the prescalar circuits 1212 to 121k. The prescalar circuits 1212 to 121k divide the frequency of the input clock signal CL1 by 2 to $2^{k-1}$. Then, the prescalar circuits 1212 to 121k output the clock signals CL2 to CLk having the frequencies f/2 to $f/2^{k-1}$. The prescalar circuits 1212 to 121k may be implemented by flip-flops. The selector circuit 122 selects any of the clock signals CL1 to CLk in accordance with the frequency of the operation clock set to the second logical block 142, and outputs the selected clock signal as a clock signal CLS to the delay setting circuit 180. As described above, the frequency setting circuit 120A has the signal propagation paths P1 to Pk on which the clock signals CL1 to CLk propagate, respectively.

Figure 16:
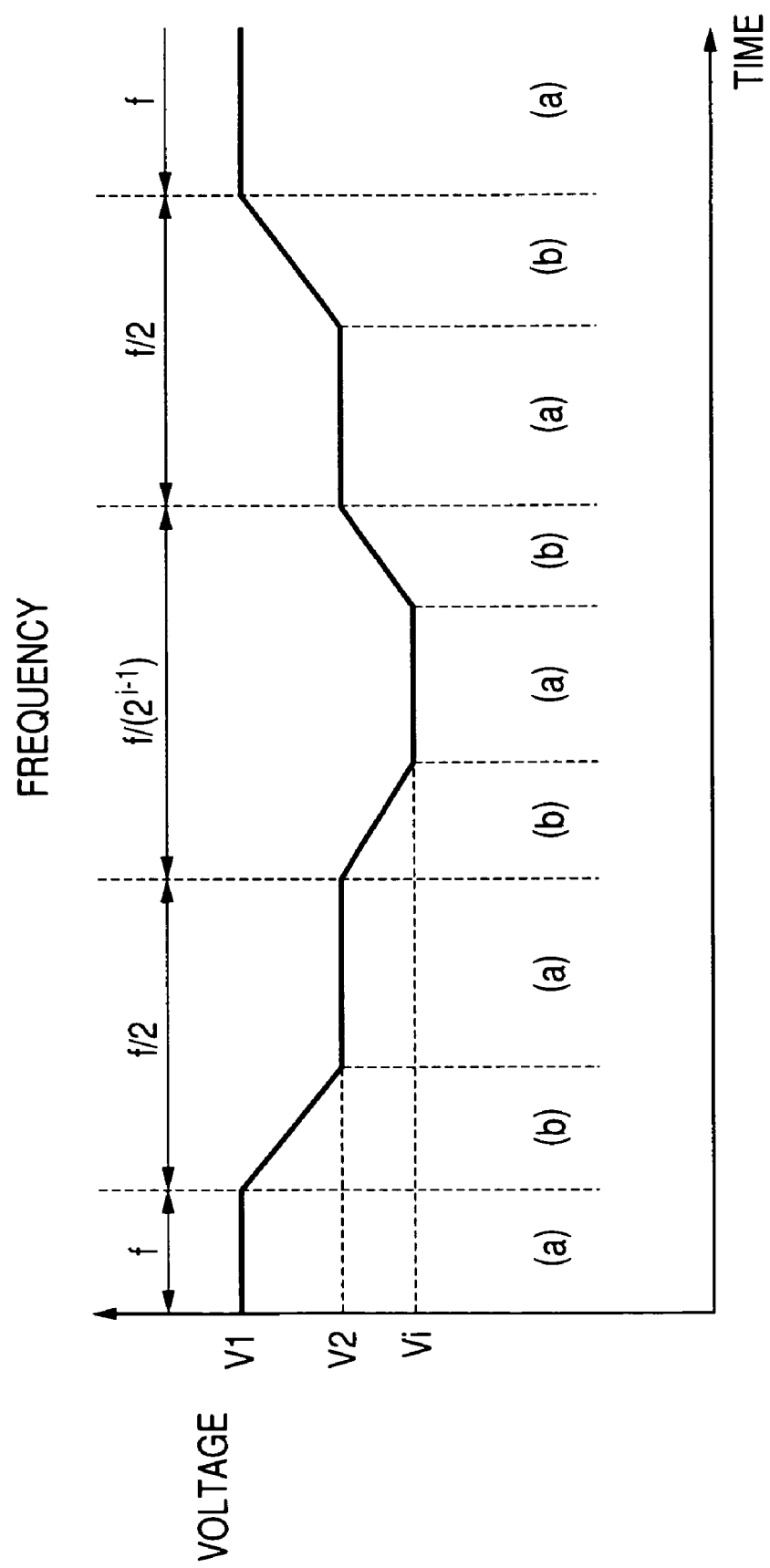
FIG. 16 is a schematic diagram showing an exemplary relation between change of voltage supplied to a second logical block 142 in operation and change of its operating frequency.

The delay setting circuit 180 has fixed delay generation units 181 to 18k and the delay adjusting circuit 130. The clock signal CLS is input into the fixed delay generation units 181 to 18k. Also, the supply voltage of the second logical block 142 is changed in accordance with the frequency of the clock signal CLS. Here, it is assumed that the supply voltages used when the second logical block 142 operates with the respective clock signals CL1, CL2, ... CLk are expressed as V1, V2, ... Vk. The operating clock frequency of the second logical block 142 is changed in accordance with throughput required by tasks. When it is necessary to process many tasks, the operation frequency of the second logical block 142 is increased. To the contrary, when there are few tasks to be processed, the operation frequency is decreased. FIG. 16 shows an exemplary relation between change of voltage supplied to the second logical block 142 in operation and change of its operating frequency. If the supply voltage of the second logical block 142 is changed, the signal delay time from the delay setting circuit 180 through the second logical block 142 to the second level shifting circuit 152 is changed. In order to keep clock skew being small even if the supply voltage is changed, it is required that the signal delay time from the delay setting circuit 180 through the second logical block 142 to the second level shifting circuit 152 is not changed even if the supply voltage is changed. Therefore, in the second embodiment, the delay setting circuit 180 includes the fixed delay generation units 181 to 18k.

The fixed delay generation units 181, 182, ... 18k correspond to the signal propagation paths P1, P2, ... Pk of the frequency setting circuit 120A, respectively. In order for the second logical block 142 shown in FIG. 14 to operate normally, the fixed delay generation units 181 to 18k are set in the following manner. That is, if the second logical block 142 operates at frequency $f/2^{i-1}$, the selector circuit 122 selects the clock signal CLi propagating through the signal propagation path Pi of the frequency setting circuit 120A and the selector circuit 190 selects the clock signal CLS propagating through the fixed delay generation unit 18i of the delay setting circuit 180.

As shown in FIG. 16, while the operating frequency of the second logical block 142 can be changed instantly, change in the supply voltage of the second logical block 142 requires certain time. The supply voltage of the second logical block 142 can be classified into two states, that is, a stable state (e.g., sections designated by (a) in FIG. 16) and a transition state (e.g., sections designated by (b) in FIG. 16). When the supply voltage of the second logical block 142 is in the stable state, the selector circuit 190 selects any of the fixed delay generation units 181 to 18k in accordance with the operating frequency at that time. On the other hand, when the supply voltage of the second logical block 142 is in the transition state, that is, changes dynamically, the clock skew of the semiconductor integrated circuit changes dynamically as well. In that case, the selector circuit 190 selects the clock signal CLS propagating through the delay adjusting circuit 130 in order to deal with the dynamic change in the clock skew of the semiconductor integrated circuit.

The signal delay time tx1 of the fixed delay generation unit 181 is set to a constant value, for example, a signal delay time of the delay adjusting circuit 130 when the second logical block 142 operates with the highest source voltage. The outputs of the fixed delay generation units 181 to 18k and the delay adjusting circuit 130 are input into the selector circuit 190. The selector circuit 190 selects any of the outputs of the fixed delay generation units 181 to 18k in accordance with the supply voltage set to the second logical block 142, and outputs the selected output to the second logical block 142.

The frequency setting circuit 120A, the first level shifting circuit 151 and the second level shifting circuit 152 are connected to the delay adjusting circuit 130. The clock signal CLS from the frequency setting circuit 120A, the clock signal CLK1 from the first level shifting circuit 151, and the clock signal CLK2 from the second level shifting circuit 152 are input into the delay adjusting circuit 130. The output of the delay adjusting circuit 130 is input into the selector circuit 190. Therefore, after the signal delay time of the clock signal CLS is adjusted in the delay adjusting circuit 130, the clock signal CLS2 may be output to the second logical block 142.

The first level shifting circuit 151 and the second level shifting circuit 152 shift the voltage levels of the clock signals output from the first logical block 141 and the second logical block 142 to be identical to each other. Then, the first level shifting circuit 151 and the second level shifting circuit 152 output the clock signals whose voltage levels have been shifted, as the clock signal CLK1 and the clock signal CLK2 to the delay adjusting circuit 130, respectively.

Figure 15:
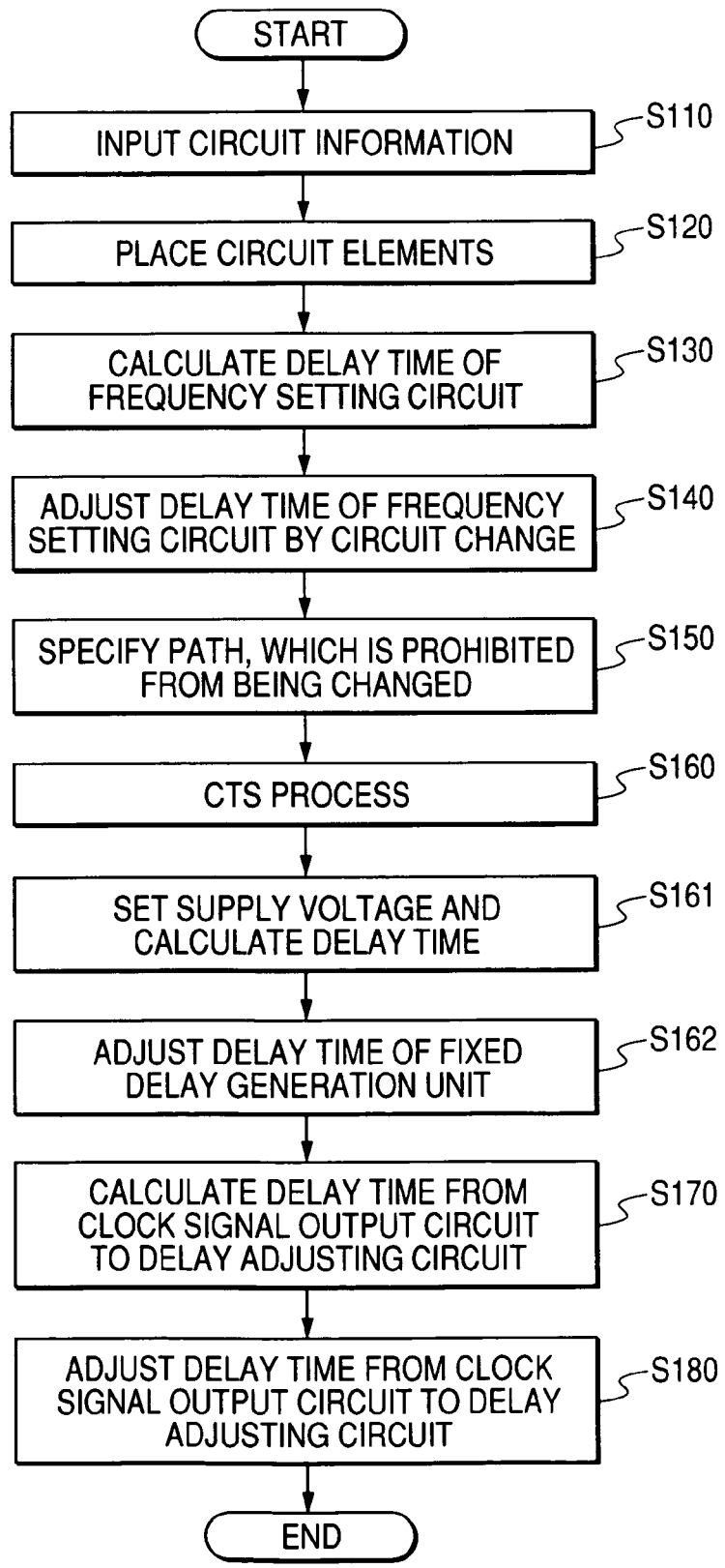
FIG. 15 is a flowchart for explaining the clock design method according to the second embodiment of the invention.

Referring to a flowchart of FIG. 15, an example of the automatic clock design method for the semiconductor integrated circuit, which is performed by the clock design apparatus shown in FIG. 13, will be described below.

Figure 14:
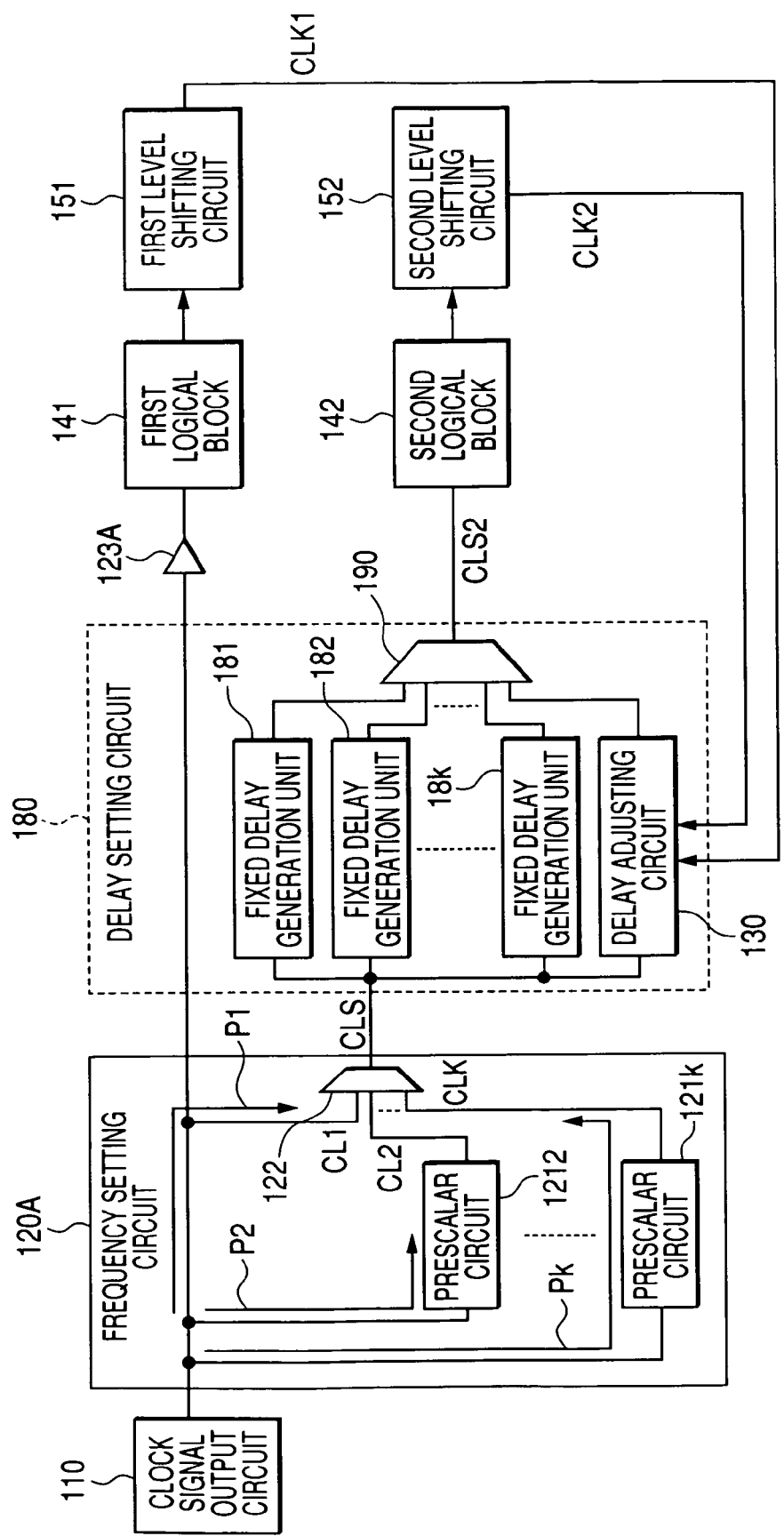
FIG. 14 is a schematic diagram showing an example of the semiconductor integrated circuit whose clock wiring is designed by the clock design apparatus according to the second embodiment of the invention.

(1) At steps S110 to S120, circuit information of the semiconductor integrated circuit shown in FIG. 14 is stored in the circuit information storage area 21 shown in FIG. 13. Then, the circuit element placement section 10 places circuit elements, based on the circuit information of the semiconductor integrated circuit. Placement information of the circuit elements is stored in the element placement storage area 22.

(2) At step S130, the calculating section 111 reads the placement information of the circuit elements from the element placement storage area 22. Then, the calculating section 111 calculates the signal delay times tp1 to tpk of the signal propagation paths P1 to Pk of the frequency setting circuit 120A, based on the placement information of the circuit elements. Here, the wirings of the signal propagation paths P1 to Pk are connected to the clock signal output circuit 110, the prescalar circuits 1212 to 121k, and the selector circuit 122. The calculated signal delay times tp1 to tpk are stored in the delay time storage area 23.

(3) At step S140, the changing section 112 reads the placement information of the circuit elements from the element placement storage area 22 and the signal delay times tp1 to tpk from the delay time storage area 23. Then, the changing section 112 changes the circuit so that the signal delay times tp1 to tpk are equal to each other by inserting a buffer circuit into the signal propagation paths P1 to Pk. New placement information of the circuit elements—for which the delay time adjusting section 11 has adjusted the signal delay time—is stored in the element placement storage area 22.

(4) At step S150, the prohibition specifying section 12 reads the placement information of the circuit elements from the element placement storage area 22. Then, the prohibition specifying section 12 specifies the signal propagation paths P1 to Pk, the selector circuit 122, the delay adjusting circuit 130 and the delay setting circuit 180, as a circuit prohibited from being changed. New placement information of the circuit elements—for which the prohibition of circuit change is specified—is stored in the element placement storage area 22.

(5) At step S160, the clock tree synthesis section 13 reads the placement information of the circuit elements from the element placement storage area 22. Then, the clock tree synthesis section 13 performs a CTS process for clock synchronization type storage elements within the first logical block 141 and the second logical block 142 with the clock signal output circuit 110 taken as a start point. Herein, the signal propagation path from the clock signal output circuit 110 to the second logical block 142 is set to pass through the fixed delay generation unit 181. In the CTS process, the circuit is changed so that the signal delay times from the clock signal output circuit 110 to the clock synchronization type storage elements are equal to each other. For example, a buffer circuit is added. However, the buffer circuit is not added to the signal propagation path and circuit for which the prohibition of the circuit change is specified. Accordingly, the buffer circuit can be added to the signal propagation path from the output of the buffer circuit 123A to each clock synchronization type storage element within the first logical block 141 and the signal propagation path from the output of the selector circuit 190 to each clock synchronization type storage element within the second logical block 142, as shown in FIG. 14. Though there are k ways of signal propagation paths P1 to Pk within the frequency setting circuit 120A, the signal delay times tp1 to tpk of the signal propagation paths P1 to Pk have been adjusted to be identical to each other. Therefore, in the CTS process, any of the signal propagation paths P1 to Pk may be selected. The layout information of the semiconductor integrated circuit for which the CTS process has been performed is stored in the layout information storage area 24.

(6) At step S161, the calculating section 111 reads the layout information from the layout information storage area 24. Then, the calculating section 111 calculates, based on the layout information, signal delay times tv1 to tvk from the output of the selector circuit 190 to the second level shifting circuit 152 when the supply voltage of the second logical block 142 is set to the voltages V1 to Vk, respectively. The calculated signal delay times tv1 to tvk are stored in the delay time storage area 23.

(7) At step S162, the changing section 112 reads the layout information from the layout information storage area 24 and the signal delay times tv1 to tvk from the delay time storage area 23. Then, the changing section 112 changes the circuit by inserting the buffer circuit into the fixed delay generation units 181 to 18k so that the signal delay times tx1 to txk of the fixed delay generation units 181 to 18k satisfy the expression (1).

$$txj = tx1 + (tv1 - tvj) \quad (1)$$

Where j=1 to k. The signal delay time tx1 in the fixed delay generation unit 181 is set to the fixed time, for example, the signal delay time of the delay adjusting circuit 130 when the second logical block 142 operates at the highest supply voltage, as previously described. If the signal delay times tx1 to txk satisfy the expression (1), the signal delay times from the input of the fixed delay generation units 181 to 18k to the second level shifting circuit 152 can be made equal to each other by selecting one of the fixed delay generation units 181 to 18k in accordance with the voltages V1 to Vk irrespective of the supply voltage set in the second logical block 142 being any of the voltages V1 to Vk. New layout information of the semiconductor integrated circuit, for which the signal delay times tx1 to txk are adjusted, is stored in the layout information storage area 24.

(8) At step S170, the calculating section 111 reads the layout information from the layout information storage area 24. Then, the calculating section 111 calculates the signal delay time $Td_A$ of the signal propagation path A and the signal delay time $Td_B$ of the signal propagation path B, based on the layout information.

Signal propagation path A: From the clock signal output circuit 110 through the first logical block 141 and the first level shifting circuit 151 to the delay adjusting circuit 130

Signal propagation path B: From the clock signal output circuit 110 through the frequency setting circuit 120A to the delay setting circuit 180, the second logical block 142 and the second level shifting circuit 152 to the delay adjusting circuit 130

Since the signal delay times tp1 to tpk have been adjusted to be identical to each other, when the signal delay path B is set, any of the signal propagation paths P1 to Pk may be selected. Also, one of the fixed delay generation units 181 to 18k is selected in accordance with the supply voltage set to the second logical block 142. When the signal propagation path B includes the delay adjusting circuit 130, the supply voltage of the second logical block 142 is set to an initial value and the delay adjusting circuit 130 is set to a delay value corresponding to the supply voltage of the second logical block 142. The calculated signal delay times $Td_A$ and $Td_B$ are stored in the delay time storage area 23.

(9) At step S180, the changing section 112 changes the circuit so that the signal delay times $Td_A$ and $Td_B$ are identical to each other in the same manner as described above with reference to FIG. 10. New layout information for which the signal delay times $Td_A$ and $Td_B$ are adjusted is stored in the layout information storage area 24.

The example of calculating the signal delay time from the output of the selector circuit 190 to the second level shifting circuit 152 at step S161 has been described above. However, if there is a great difference between the distance from the output of the selector circuit 190 to the second level shifting circuit 152 and the distance from the output of the selector circuit 190 to the clock synchronization type storage element within the second logical block 142, the average value of signal delay times from the output of the selector circuit 190 to all the clock synchronization type storage elements within the second logical block 142 may be calculated.

As described above, according to the clock design apparatus of the second embodiment of the invention, the signal delay times tx1 to txk of the fixed delay generation units 181 to 18k selected in accordance with the supply voltage set to the second logical block 142 are adjusted in accordance with the supply voltage set to the second logical block. Therefore, the clock skew in the semiconductor integrated circuit including the fixed delay generation units 181 to 18k can be reduced. The other configuration is substantially the same as in the first embodiment, and not described again.

Other Embodiments

Although the invention has been described above with the first and second embodiments, it will be understood that the invention is not limited to the description and drawings constituting a part of this disclosure. Those skilled in the art would appreciate various variations, examples and operation techniques from this disclosure.

In the above explanation of the first and second embodiments, the calculating section 111 calculates the signal delay time of each signal propagation path within the frequency setting circuits 120, 120A, based on the placement information of circuit elements at step S130. However, the signal delay time of each signal propagation path may be calculated by designing the global wiring or detail wiring within the frequency setting circuits 120, 120A.

It is natural that the invention may cover various other embodiments not described here. Accordingly, the technical scope of the invention may be defined only by the appended claims that are supported by the above description.

What is claimed is:

1. A clock design apparatus comprising:
   a delay time adjusting section configured to adjust signal delay time of signal propagation paths on a semiconductor integrated circuit to be designed;
   a prohibition specifying section configured to provide circuit specifications which identify a part of the signal propagation paths as a circuit prevented from being changed; and
   a clock tree synthesis section configured to perform a clock tree synthesis (CTS) process to synthesize a clock tree of the semiconductor integrated circuit in accordance with the circuit specifications made by the prohibition specifying section, wherein delay times associated with fixed delay information are obtained;
   wherein the delay adjusting section is configured to specify delay as a function of the delay times:
   wherein the semiconductor integrated circuit comprises a first logical block, and a second logical block, wherein an operating frequency of the second logical block and a voltage supplied to the second logical block are variable;
   wherein an operating frequency of the first logical block and a voltage supplied to the first logical block are predetermined fixed values: and
   wherein clock delay adjustments that are independent of changes to apparatus supply voltages may be obtained as a function of the specified delay.

2. The clock design apparatus according to claim 1, wherein the delay time adjusting section comprises a series of cascaded delay generation sections.

3. The clock design apparatus according to claim 2 wherein each delay generation section of the series of cascaded delay generation sections comprises a first NAND circuit, a second NAND circuit, and an inverter circuit, wherein an output of the first NAND circuit is coupled to an input of the second NAND circuit, and an output of the second NAND circuit is coupled to the input of the inverter circuit.

4. The clock design apparatus according to claim 1 further comprising a storage section.

5. The clock design apparatus according to claim 4 further comprising a determining section which determines a first skew for the first logic block, and compares the first skew with a permissible value from the storage section.

6. A clock design apparatus comprising:
   a delay time adjusting section configured to adjust signal delay time of signal propagation paths on a semiconductor integrated circuit to be designed;
   a prohibition specifying section configured to provide circuit specifications which identify a part of the signal propagation paths as a circuit prevented from being changed; and
   a clock tree synthesis section configured to perform a clock tree synthesis (CTS) process to synthesize a clock tree of the semiconductor integrated circuit in accordance with the circuit specifications made by the prohibition specifying section, wherein delay times associated with fixed delay information are obtained;
   wherein the delay time adjusting section is configured to specify delay as a function of the delay times and comprises:
   a calculating section configured to calculate the signal delay times of the signal propagation paths; and
   a changing section configured to change circuits of the signal propagation paths;
   wherein the semiconductor integrated circuit comprises a first logical block, and a second logical block, wherein an operating frequency of the second logical block and a voltage supplied to the second logical block are variable;

wherein an operating frequency of the first logical block and a voltage supplied to the first logical block are predetermined fixed values;

wherein the delay time adjusting section further comprises a determining section configured to determine based on the signal delay time calculated by the calculating section if a clock skew of the first logical block is equal to or less than a predetermined value and if a clock skew of the second logical block is equal to or less than the predetermined value, after the changing section changes the circuits of the signal propagation paths;

wherein clock delay adjustments that are independent of changes to apparatus supply voltages may be obtained as a function of the specified delay.

7. The clock design apparatus according to claim 6, wherein the delay time adjusting section comprises a series of cascaded delay generation sections.

8. The clock design apparatus according to claim 7 wherein each delay generation section of the series of cascaded delay generation sections comprises a first NAND circuit, a second NAND circuit, and an inverter circuit.

9. The clock design apparatus according to claim 8 wherein an output of the first NAND circuit is coupled to an input of the second NAND circuit, and an output of the second NAND circuit is coupled to the input of the inverter circuit.

10. The clock design apparatus according to claim 9 further comprising a storage section.

11. The clock design apparatus according to claim 10 wherein the storage section comprises a circuit information storage area, an element placement storage area, a delay time storage area, and a layout information storage area.

12. The clock design apparatus according to claim 11 wherein the changing section is configured to change circuits of the signal propagation paths by adding a buffer circuit.

13. A clock design apparatus comprising:
    a delay time adjusting section configured to adjust signal delay time of signal propagation paths on a semiconductor integrated circuit to be designed;
    a prohibition specifying section configured to provide circuit specifications which identify a part of the signal propagation paths as a circuit prevented from being changed;
    a clock tree synthesis section configured to perform a clock tree synthesis process to synthesize a clock tree of the semiconductor integrated circuit in accordance with the circuit specifications made by the prohibition specifying section, wherein delay times associated with fixed delay information are obtained; and
    a fixed delay-generation-unit adjusting section configured to adjust signal delay times of a plurality of fixed delay generation units;
wherein the delay adjusting section is configured to specify delay as a function of the delay times:
wherein the semiconductor integrated circuit comprises a first logical block, and a second logical block;
wherein the plurality of fixed delay generation units are different from each other in signal delay time;
wherein an operating frequency of the first logical block and a voltage supplied to the first logical block are predetermined fixed values;
wherein an operating frequency of the second logical block and a voltage supplied to the second logical block are variable; and
wherein clock delay adjustments that are independent of changes to apparatus supply voltages may be obtained as a function of the specified delay.

14. The clock design apparatus according to claim 13 further comprising a storage section, wherein the storage section comprises a circuit information storage area, an element placement storage area, a delay time storage area, and a layout information storage area.

15. The clock design apparatus according to claim 13 wherein the changing section is configured to change circuits of the signal propagation paths by adding a buffer circuit.

16. An automatic clock design method for designing a clock wiring of a semiconductor integrated circuit, the method comprising:
    reading circuit information of the semiconductor circuit to be designed;
    adjusting signal delay times of signal propagation paths on the semiconductor integrated circuit;
    providing circuit specifications which identify a part of the signal propagation paths as a circuit prohibited from being changed;
    storing, in a storage device, new circuit information of the semiconductor integrated circuit comprising the circuit prohibited from being changed;
    reading the new circuit information;
    performing, by a processor, a clock tree synthesis (CTS) process to synthesize a clock tree of the semiconductor integrated circuit based on the read new circuit information, wherein delay times associated with fixed delay information are obtained;
    determining whether or not each of clock skews of a plurality of logical blocks of the semiconductor integrated circuit satisfies a permissible value, which is set to reduce differences in a clock skew among the plurality of logical blocks;
    specifying, by the processor, delays as a function of the delay times; and
    providing clock design wiring information of the semiconductor circuit as an output;
wherein the semiconductor integrated circuit comprises a first logical block and a second logical block, wherein an operating frequency of the first logical block and a voltage supplied to the first logical block are predetermined fixed values and an operating frequency of the second logical block and a voltage supplied to the second logical block are variable;
wherein clock delay adjustments that are independent of changes to the semiconductor integrated circuit supply voltages may be obtained as a function of the specified delay.

17. An automatic clock design method for designing a clock wiring of a semiconductor integrated circuit, the method comprising:
    reading circuit information of the semiconductor circuit to be designed;
    adjusting signal delay times of signal propagation paths on the semiconductor integrated circuit;
    providing circuit specifications which identify a part of the signal propagation paths as a circuit prohibited from being changed;
    storing, in a storage device, new circuit information of the semiconductor integrated circuit comprising the circuit prohibited from being changed;
    reading the new circuit information;
    performing, by a processor, a clock tree synthesis (CTS) process to synthesize a clock tree of the semiconductor integrated circuit based on the read new circuit information, wherein delay times associated with fixed delay information are obtained;
    adjusting each of the signal delay times of a plurality of fixed delay generation units of the semiconductor integrated circuit;

specifying, by the processor, delays as a function of the delay times; and providing clock design wiring information of the semiconductor circuit as an output;

wherein the semiconductor integrated circuit comprises a first logical block and a second logical block, wherein an operating frequency of the first logical block and a voltage supplied to the first logical block are predetermined fixed values and an operating frequency of the second logical block and a voltage supplied to the second logical block are variable;

wherein clock delay adjustments that are independent of changes to the semiconductor integrated circuit supply voltages may be obtained as a function of the specified delay.

18. The automatic clock design method for designing a clock wiring of a semiconductor integrated circuit of claim 17 wherein adjusting signal delay times of the signal propagation paths on the semiconductor integrated circuit comprises changing a set number of states of a buffer inserted into the signal propagation paths.

19. The automatic clock design method for designing a clock wiring of a semiconductor integrated circuit of claim 17 wherein adjusting signal delay times of the signal propagation paths on the semiconductor integrated circuit comprises changing a set fan-out number of a buffer circuit.

* * * * *